US010021221B2

(12) United States Patent
Parthasarathy et al.

(10) Patent No.: US 10,021,221 B2
(45) Date of Patent: Jul. 10, 2018

(54) METHODS AND SYSTEMS FOR DETECTION AND CLASSIFICATION OF MULTIMEDIA CONTENT IN SECURED TRANSACTIONS USING PATTERN MATCHING

(71) Applicant: Citrix Systems, Inc., Fort Lauderdale, FL (US)

(72) Inventors: Kannan Parthasarathy, Palo Alto, CA (US); Hsiehyu Fuh, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 286 days.

(21) Appl. No.: 14/629,917

(22) Filed: Feb. 24, 2015

(65) Prior Publication Data

US 2016/0248684 A1   Aug. 25, 2016

(51) Int. Cl.
*H04L 29/08* (2006.01)
*H04L 29/06* (2006.01)

(52) U.S. Cl.
CPC .............. *H04L 69/22* (2013.01); *H04L 67/02* (2013.01); *H04L 67/141* (2013.01); *H04L 67/146* (2013.01); *H04L 67/28* (2013.01); *H04L 67/42* (2013.01)

(58) Field of Classification Search
None
See application file for complete search history.

(56) References Cited

U.S. PATENT DOCUMENTS

| 7,103,008 | B2 | 9/2006 | Greenblat et al. |
| 7,325,185 | B1 * | 1/2008 | Szor ................. G06F 21/55 |
| | | | 713/188 |
| 8,326,920 | B1 | 12/2012 | Modadugu et al. |
| 8,327,128 | B1 | 12/2012 | Prince et al. |
| 8,671,069 | B2 | 3/2014 | Chang et al. |

(Continued)

FOREIGN PATENT DOCUMENTS

EP   2725757 A1   4/2014

OTHER PUBLICATIONS

International Search Report and Written Opinion issued in PCT/US2015/053047 dated Feb. 25, 2016; 17 pages.

(Continued)

*Primary Examiner* — Huy D Vu
*Assistant Examiner* — Bao G Nguyen
(74) *Attorney, Agent, or Firm* — Allen, Dyer, Doppelt & Gilchrist, P.A.

(57) ABSTRACT

An apparatus is provided for classifying content in one or more transactions. The apparatus includes a transaction boundary detector configured to detect boundaries of the transactions associated with a first server or a first destination. The apparatus further includes a multimedia session generator configured to generate a multimedia session object based on the detected boundaries of the one or more transactions. The apparatus further includes a multimedia classifier configured to classify the content associated with a first multimedia session as being communicated under at least one of: HTTP live streaming (HLS) protocols, dynamic adaptive streaming over HTTP (DASH) protocols, adaptive bit rate protocols, progressive download protocols, or non-multimedia protocols.

46 Claims, 10 Drawing Sheets

(56) References Cited

U.S. PATENT DOCUMENTS

| | | |
|---|---|---|
| 8,782,722 B1 | 7/2014 | Kellicker |
| 9,191,284 B2 | 11/2015 | Kordasiewicz et al. |
| 9,215,424 B2 | 12/2015 | Bappu et al. |
| 9,311,499 B2 | 4/2016 | Redlich et al. |
| 9,325,765 B2 | 4/2016 | Su et al. |
| 2001/0032878 A1 | 10/2001 | Tsiounis et al. |
| 2002/0033844 A1* | 3/2002 | Levy ................ G06F 21/10 715/744 |
| 2003/0004688 A1* | 1/2003 | Gupta ................ G06F 21/55 702/188 |
| 2003/0032391 A1 | 2/2003 | Schweinhart et al. |
| 2003/0105830 A1* | 6/2003 | Pham ................ H04L 63/0281 709/216 |
| 2004/0210756 A1 | 10/2004 | Mowers et al. |
| 2004/0255115 A1 | 12/2004 | DeMello et al. |
| 2005/0273592 A1* | 12/2005 | Pryor ................ H04L 9/32 713/150 |
| 2007/0073837 A1 | 3/2007 | Johnson-McCormick et al. |
| 2008/0062863 A1 | 3/2008 | Ginde |
| 2008/0168559 A1* | 7/2008 | Touitou ............ H04L 63/0236 726/23 |
| 2008/0222734 A1 | 9/2008 | Redlich et al. |
| 2008/0294556 A1 | 11/2008 | Anderson |
| 2009/0104954 A1 | 4/2009 | Weber et al. |
| 2009/0172129 A1 | 7/2009 | Singh et al. |
| 2009/0241159 A1 | 9/2009 | Campagna et al. |
| 2009/0248494 A1 | 10/2009 | Hueter et al. |
| 2010/0123727 A1 | 5/2010 | Kwa et al. |
| 2011/0082924 A1 | 4/2011 | Gopalakrishnan |
| 2011/0243553 A1 | 10/2011 | Russell |
| 2012/0084423 A1 | 4/2012 | McGleenon |
| 2013/0139164 A1 | 5/2013 | Balko |
| 2013/0144785 A1 | 6/2013 | Karpenko et al. |
| 2013/0198511 A1 | 8/2013 | Yoo et al. |
| 2014/0269269 A1 | 9/2014 | Kovvali et al. |
| 2015/0016253 A1* | 1/2015 | Jaska ................ H04L 47/22 370/230.1 |
| 2015/0026127 A1 | 1/2015 | Zachrisen et al. |
| 2015/0288617 A1* | 10/2015 | Dasher ................ H04L 47/801 709/226 |
| 2016/0043827 A1* | 2/2016 | Filson ................ H04K 3/22 370/252 |
| 2016/0088322 A1 | 3/2016 | Horev et al. |
| 2016/0094602 A1 | 3/2016 | Fuh |
| 2016/0173526 A1* | 6/2016 | Kasman ............ H04L 63/1458 726/23 |
| 2016/0241626 A1 | 8/2016 | Parthasarathy |

OTHER PUBLICATIONS

Bestavros et al.; "Performance Evaluation of Two-Shadow Speculative Concurrency Control"; Feb. 1993; 201 pages.

* cited by examiner

470

480

METHODS AND SYSTEMS FOR DETECTION AND CLASSIFICATION OF MULTIMEDIA CONTENT IN SECURED TRANSACTIONS USING PATTERN MATCHING

BACKGROUND

The recent few years has witnessed an explosive growth of data traffic in networks, particularly in cellular wireless networks. This growth has been fueled by a number of new developments that includes faster, smarter, and more intuitive mobile devices such as the popular iPhone® series and the iPad® series, as well as faster wireless and cellular network technologies that deliver throughputs on par or better than fixed line broadband technologies.

For many people today, a primary mode of access to the Internet is via mobile devices using cellular wireless networks. Users have come to expect the same quality of experience as in fixed line broadband networks. To meet this insatiable demand, wireless network operators are taking a number of steps such as installing additional cell towers in congested areas, upgrading the backhaul network infrastructure that connects the base stations with the packet core, and deploying newer radio access technologies such as Dual-Cell High Speed Downlink Packet Access (DC-HSDPA) and Long Term Evolution (LTE). While these approaches help with meeting the demand for quality of experience, the slow pace at which major network upgrades can be made is not keeping up with the rate at with data traffic is growing. Furthermore, the cost of such network upgrades is not commensurate with the revenue per subscriber that the wireless operator is able to get, i.e., the cost being much higher than any increase in revenue the wireless operator can expect. Faced with these challenges, cellular wireless network operators across the globe are introducing various traffic management techniques to control the growth of data traffic and increase their revenues at the same time.

Traffic Management is a broad concept and includes techniques such as throttling of low priority traffic, blocking or time shifting certain types of traffic, and traffic optimization. Optimization of web and video traffic is a key component in the array of traffic management techniques used by wireless operators. Web traffic refers to traditional web site browsing, and video traffic refers to watching videos over the Internet—between the two, web and video traffic account for more than 80% of the data traffic in typical cellular wireless networks.

DETAILED DESCRIPTION

Figure 1:
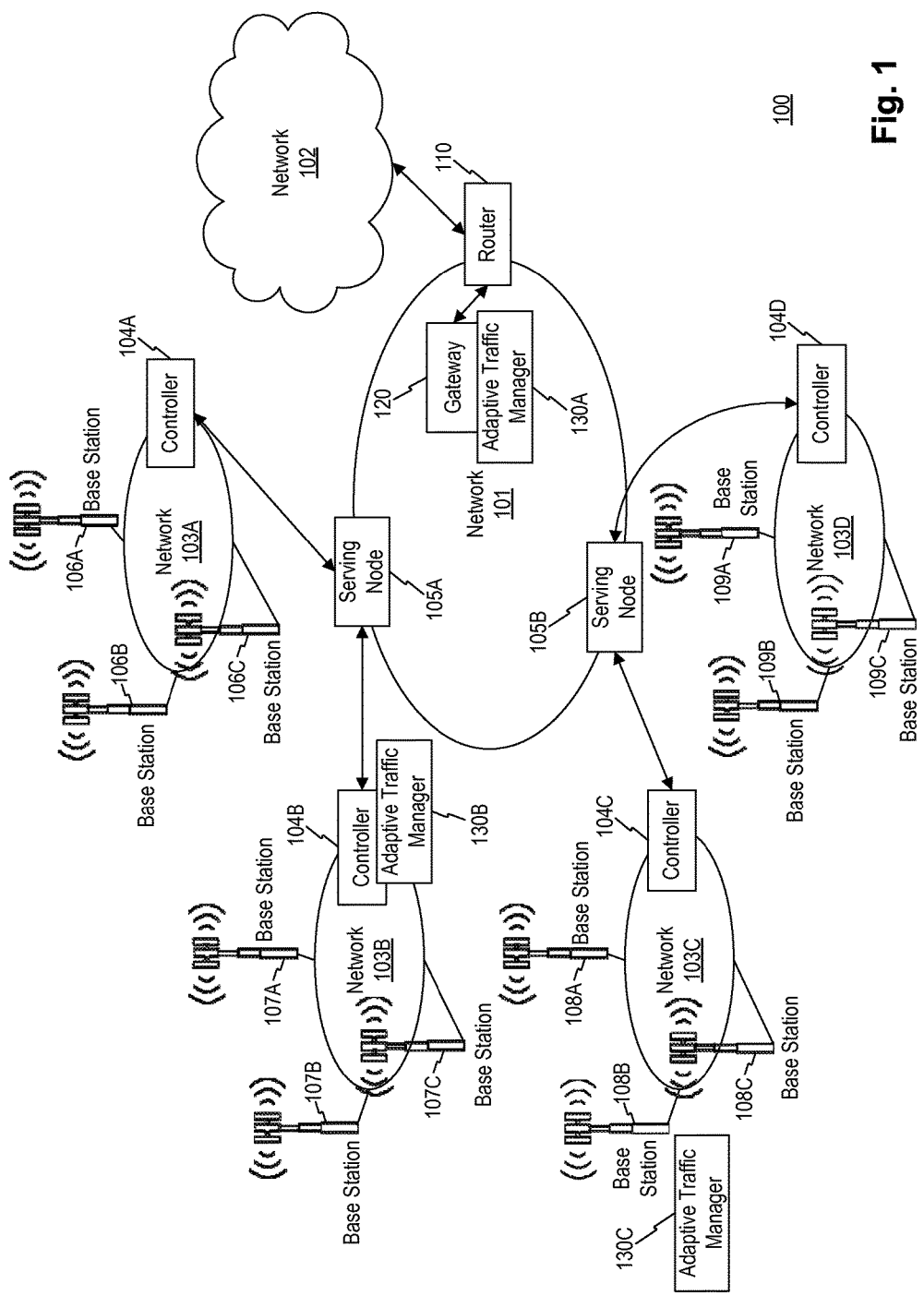
FIG. 1 is a block diagram of an exemplary network system, consistent with embodiments of the present disclosure.

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The present disclosure relates to traffic management, and more particularly to detecting and classifying content in secured or unsecured transactions. The detection and classification of content include detecting boundaries of the secured or unsecured transactions; generating a multimedia session object based on the detected boundaries of the transactions; and classifying, based on the number of transactions indicated by the multimedia session object, the content as being communicated under: HTTP live streaming (HLS) protocols, dynamic adaptive streaming over HTTP (DASH) protocols, and/or non-adaptive bit-rate protocols including progressive download protocols or non-multimedia protocols. Such classification allows more customized traffic management or optimization. For example, with such classification, the traffic optimization can be customized for communication using iOS devices or Android devices, for adaptive bit-rate communications or progressive download communications, and for communications containing multimedia content or no multimedia content.

Network congestion or overload conditions in networks are often localized both in time and space and affect only a small set of users at any given time. This can be caused by the topology of communication systems. In an exemplary cellular communication system, such as the system shown in FIG. 1, the system can have a tree-like topology, with a router or a gateway being the root of the tree and the mobile base stations being the leaves. This tree-like topology is similar across cellular technologies including Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax) and Long Term Evolution (LTE). In a tree-like structure of a wireless network, the impact of network overload conditions depends on the level of aggregation in the network where that overload condition occurs. For example, an overload condition at a base station level affects only those users who are connected to that base station. Therefore, in some embodiments, the adaptive traffic management identifies the aggregation level at which an overload condition occurs and then applies traffic management techniques in a holistic fashion across only those users that are affected by the overload condition.

Adaptive traffic management is an approach wherein traffic management techniques such as web and video optimization can be applied selectively based on monitoring key indicators that have an impact on the Quality of Experience (QoE) of users or subscribers. Applying optimization can involve detecting the presence of multimedia content in secured or unsecured transactions and classifying multimedia content in the transactions. Various embodiments of the present disclosure provide detecting the presence of multimedia content and classifying the multimedia content using, for example, pattern matching. In the present disclosure, a subscriber can be a mobile terminal user who subscribes to a wireless or cellular network service. While the subscriber refers to the mobile terminal user here, future references to subscriber can also refer to a terminal that is used by the subscriber, or refer to a client device used by the subscriber.

FIG. 1 is a block diagram of an exemplary network system. Exemplary communication system 100 can be any type of system that transmits data packets over a network. For example, the exemplary communication system 100 can include one or more networks transmitting data packets across wired or wireless networks to terminals (terminals not shown in FIG. 1). The exemplary communication system 100 can have network architectures of, for example, a GSM network, a UMTS network that adopts Wideband Code Division Multiple Access (W-CDMA) radio access technology, a CDMA2000 network, and a WiMax network.

The exemplary communication system 100 can include, among other things, one or more networks 101, 102, 103 (A-D), one or more controllers 104(A-D), one or more serving nodes 105(A-B), one or more base stations 106(A-D)-109(A-D), a router 110, a gateway 120, and one or more adaptive traffic managers 130(A-C). At a high level, the network topology of the exemplary communication system 100 can have a tree-like topology with gateway 120 being the tree's root node and base stations 106-109 being the leaves.

Router 110 is a device that is capable of forwarding data packets between computer networks, creating an overlay Internetwork. Router 110 can be connected to two or more data lines from different networks. When a data packet comes in on one of the lines, router 110 can determine the ultimate destination of the data packet and direct the packet to the next network on its journey. In other words, router 110 can perform "traffic directing" functions. In the exemplary embodiment shown in FIG. 1, router 110 communicates with network 102 and gateway 120. Router 110 directs traffic from the network 102 to the gateway 120 and vice versa.

Network 101 can be any combination of radio network, wide area networks (WANs), local area networks (LANs), or wireless networks suitable for packet-type communications, such as Internet communications. For example, in one exemplary embodiment, network 101 can be a General Packet Radio Service (GPRS) core network, which provides mobility management, session management and transport for Internet Protocol packet services in GSM and W-CDMA networks. The exemplary network 101 can include, among other things, a gateway 120, and one or more serving nodes 105(A-B).

Gateway 120 is a device that converts formatted data provided in one type of network to a particular format required for another type of network. Gateway 120, for example, may be a server, a router, a firewall server, a host, or a proxy server. Gateway 120 has the ability to transform the signals received from router 110 into a signal that network 101 can understand and vice versa. Gateway 120 may be capable of processing webpage, image, audio, video, and T.120 transmissions alone or in any combination, and is capable of full duplex media translations. As an exemplary embodiment, gateway 120 can be a Gateway GPRS Support Node (GGSN) that supports interworking between the GPRS network and external packet switched networks, like the Internet and X.25 networks.

Serving nodes 105 are devices that deliver data packets from gateway 120 to a corresponding network 103 within its geographical service area and vice versa. A serving node 105 can be a server, a router, a firewall server, a host, or a proxy server. A serving node 105 can also have functions including packet routing and transfer, mobility management (attach/detach and location management), logical link management, network accessing mediation and authentication, and charging functions. As an exemplary embodiment, a serving node 105 can be a Serving GPRS Support Node (SGSN). SGSN can have location register, which stores location information, e.g., current cell, current visitor location (Visitor Location Register) and user profiles, e.g., International Mobile Subscriber Identity (IMSI), and addresses used in the packet data network, of all GPRS users registered with this SGSN.

Network 102 can include any combination of wide area networks (WANs), local area networks (LANs), or wireless networks suitable for packet-type communications. In some exemplary embodiments, network 102 can be, for example, Internet and X.25 networks. Network 102 can communicate data packet with network 101 with or without router 110.

Networks 103 can include any radio transceiver networks within a GSM or UMTS network or any other wireless networks suitable for packet-type communications. In some exemplary embodiments, depending on the underlying transport technology being utilized, the Radio Access Network (RAN) or Backhaul area of network 103 can have a ring topology. In some embodiments, network 103 can be a RAN in a GSM system or a Backhaul area of a UMTS system. The exemplary network 103 can include, among other things, base stations 106-109 (e.g., base transceiver stations (BTSs) or Node-Bs), and one or more controllers 104(A-C) (e.g., base-station controllers (BSCs) or radio network controllers (RNCs)). Mobile terminals (not shown in FIG. 1) communicate with BTS/Node-B 106-109 which have radio transceiver equipment. BTS/Node-B 106-109 communicate with BSC/RNC 104(A-C), which are responsible for allocation of radio channels and handoffs as users move from one cell to another. The BSC/RNC 104(A-C) in turn communicate to serving nodes 105, which manage mobility of users as well as provide other functions such as mediating access to the network and charging.

As shown in FIG. 1, adaptive traffic manager 130 can be deployed at one or more locations within communication system 100, including various locations within network 101 and 103. In some embodiments, adaptive traffic manager 130 can be located at gateway 120, at controller 104, at one or more base stations 106-109, or any other locations. Adaptive traffic manager 130 can be either a standalone network element or can be integrated into existing network elements such as gateway 120, controllers 104, and base stations 106-109. Adaptive traffic manager 130 can continuously monitor several parameters of communication system 100. The parameters can be used to generate traffic management rules. The traffic management rules are generated dynamically and change in real-time based on the monitored parameters. After the rules are generated in real time, the rules are applied to data traffic being handled by adaptive traffic manager 130. Moreover, adaptive traffic manager 130 can include a multimedia detector and classifier 220 (shown in FIG. 2) for detecting the presence of multimedia contents in secured or unsecured transactions and for classifying the multimedia content in secured or unsecured transactions. Multimedia detector and classifier 220 is described in more detail below.

To optimize web and video traffic, traffic management techniques can be implemented on a proxy device (e.g., adaptive traffic manager 130) that is located somewhere between a content server and client devices (e.g., mobile terminals). The proxy device can determine the type of content requested by a mobile terminal (e.g., video content) and apply optimization techniques. The content providers can transmit content using unsecured or secured communication protocols such as Hypertext Transfer Protocol Secure (HTTPS), Transport Layer Security (TLS), and Secure Sockets Layer (SSL) protocols. The proxy device can determine the type of content being transmitted in both unsecured and secured transactions using client requests and server responses. In secured transactions, the client requests and server responses are encrypted. Therefore the content of the client requests or server response may not be decipherable by the proxy device.

Moreover, a variety of multimedia protocols above the HTTP layer are available for transmitting of multimedia contents. The protocols can generally be classified into two broad categories: progressive download (PD) protocols and adaptive bit-rate protocols. Examples of adaptive bit-rate protocols include HTTP live streaming (HLS), dynamic adaptive streaming over HTTP (DASH), and smooth streaming. Examples of progressive download protocols include flash video (FLV) file and Mpeg-4 (MP4) file downloads over HTTP.

For both progressive download and adaptive bit-rate protocols, the same multimedia content at multiple quality levels (e.g., video resolutions 1080p, 720p, etc.) can be stored at the server for transmitting to client. In the case of transmitting of multimedia contents using progressive download protocols, the multimedia quality level requested by the client cannot be changed after the initial selection at the beginning of transmission. In the case of transmitting of multimedia contents using adaptive bit-rate protocols, the multimedia quality level requested by the client can be changed to reflect fluctuations in the available network bandwidth between the server and the client. Therefore, adaptive bit-rate protocols typically provide a better user experience because the highest available quality level can be selected based on the available network bandwidth.

To apply traffic management techniques, such as to apply streaming policy control (SPC) to the transmission of multimedia contents, it is usually required to determine whether progressive download protocols or adaptive bit-rate protocols are used for the transmission. Moreover, multimedia session reporting can also require distinguishing between progressive download protocols or adaptive bit-rate protocols. Streaming policy control can be any traffic management technique that manages data flow or controls congestion associated with streaming of multimedia data across a network, such as the Internet. For example, SPC can allow streaming of the multimedia data to more effectively share bandwidths with other network traffics. SPC can also improves smoothness in streaming and provide decreased and more predictable latency.

Figure 2:
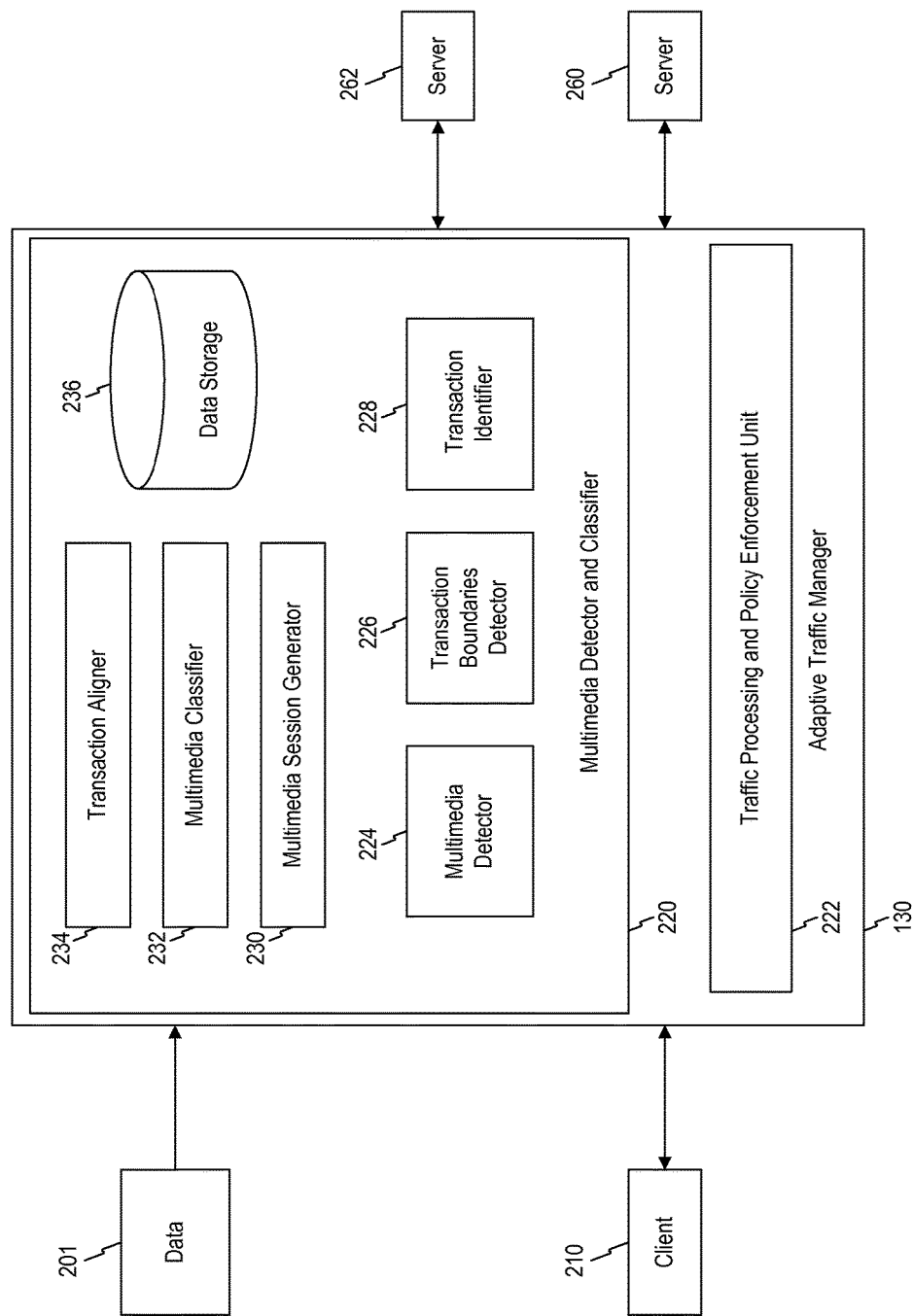
FIG. 2 is a block diagram illustrating an exemplary embodiment of an adaptive traffic manager, consistent with embodiments of the present disclosure.

FIG. 2 is a block diagram illustrating an embodiment of an exemplary adaptive traffic manager 130. In some embodiments, as shown in FIG. 2, a multimedia detector and classifier 220 can be integrated with adaptive traffic manager 130. In some embodiments, multimedia detector and classifier 220 can be integrated into other existing network elements such as gateway 120, controllers 104, and/or one or more base stations 106-109. Multimedia detector and classifier 220 can also be a standalone network element located at gateway 120, controller 104, one or more base stations 106-109, or any other proper locations.

As shown in FIG. 2, adaptive traffic manager 130 can include, among other things, a traffic processing and policy enforcement unit 222 and multimedia detector and classifier 220. Adaptive traffic manager 130 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible and/or non-transitory computer-readable medium, such as random access memory (RAM), read-only memory (ROM), volatile memory, non-volatile memory, hard drives, compact disc read-only memory (CD ROM), digital versatile disc (DVD) memory, flash drives, magnetic strip storage, semiconductor storage, optical disc storage, magneto-optical disc storage, flash memory, registers, caches, and/or any other storage medium. Singular terms, such as "memory" and "computer-readable storage medium," can additionally refer to multiple structures, such as a plurality of memories and/or computer-readable storage mediums. Alternatively, the methods can be implemented in hardware components or combinations of hardware and software such as, for example, ASICs or one or more computer.

Adaptive traffic manager 130 can obtain external data 201 for processing. External data 201 can include network probes, Remote Authentication Dial-In User Service (RADIUS), Policy Charging and Rules Function (PCRF), and Subscriber Profile Repository (SPR). Adaptive traffic manager 130 can also communicate with one or more terminals (e.g., client 210) and server 260, either directly or indirectly.

Traffic processing and policy enforcement (TPPE) unit 222 is a lower stack in the processing stack of adaptive traffic manager 130. TPPE unit 222 can receive content, which can include multimedia content such as video and/or web data, and provide the content to other elements and/or modules in adaptive traffic manager 130. The content can be stored in a data storage device (e.g., data storage 236) that is local to or remote from adaptive traffic manager 130. TPPE unit 222 is responsible for routing traffic between client 210 and one or more servers, e.g., server 260 and server 262. TPPE unit 222 can also implement traffic management techniques including blocking, rate limiting, lossless and lossy data compression, and other traffic optimization techniques. TPPE unit 222 can be a software program and/or a hardware device.

Multimedia detector and classifier 220 can include, among other things, a multimedia detector 224, a transaction boundaries detector 226, a transaction identifier 228, a multimedia session generator 230, a multimedia classifier 232, and a transaction aligner 234. Each of these components can be one or more modules, which can be one or more packaged functional hardware units designed for use with other components or a part of a program that performs a particular function, corresponding to the particular step, of related functions. Multimedia detector and classifier 220 can also include a data storage 236, which can also be external to multimedia detector and classifier 220.

Figure 4A:
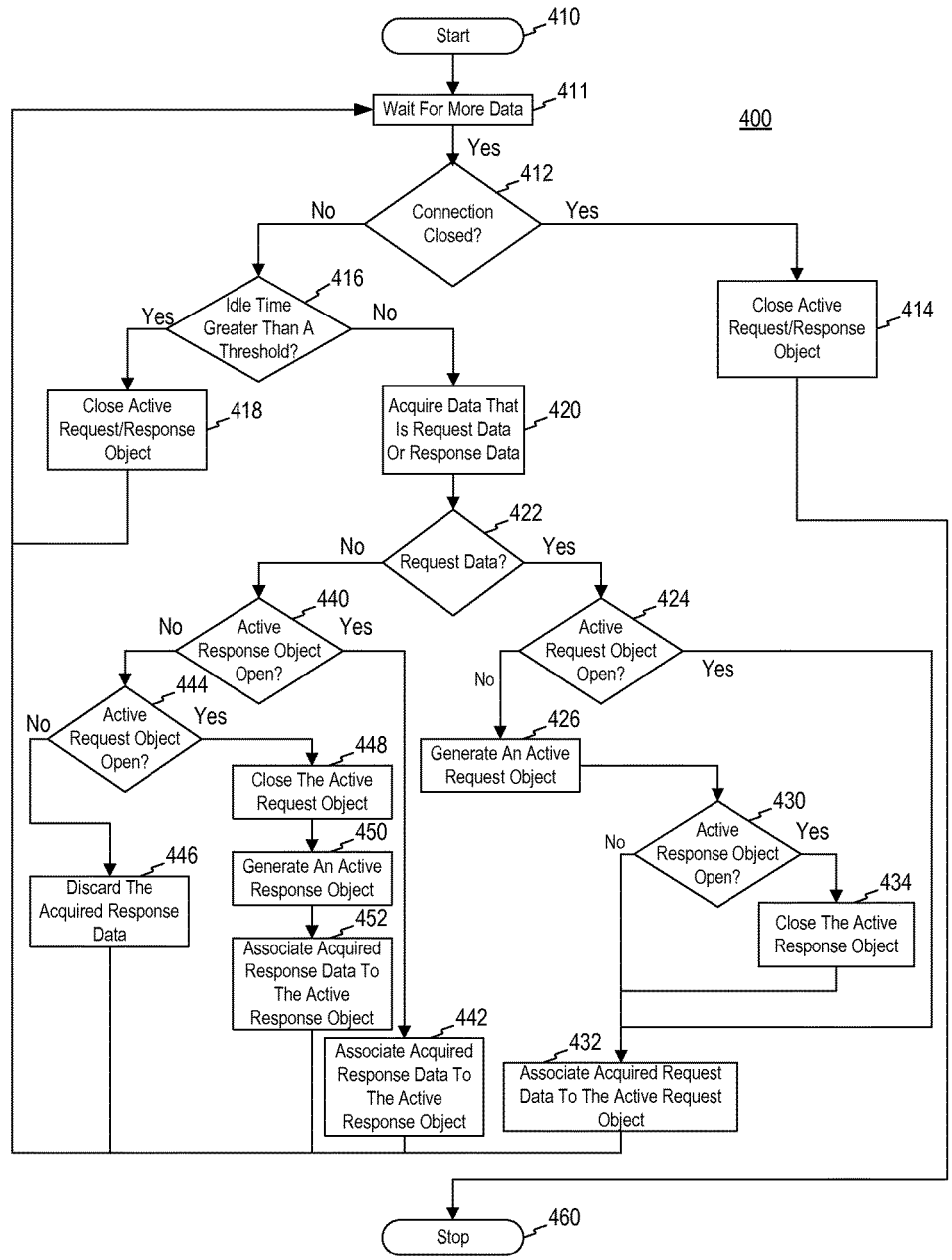
FIG. 4A is a flowchart representing an exemplary method for detecting transaction boundaries, consistent with embodiments of the present disclosure.
Figure 4B:
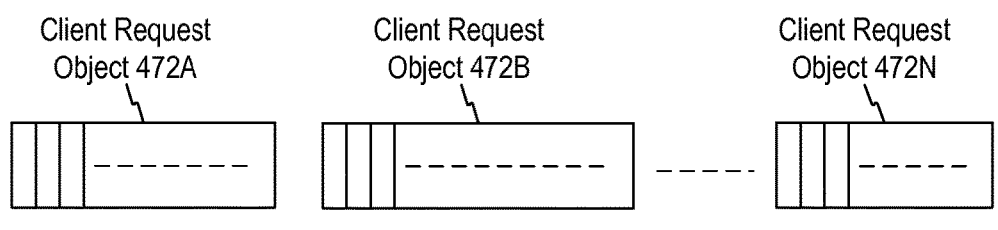
FIG. 4B is a block diagram illustrating exemplary client request objects, consistent with embodiments of the present disclosure.
Figure 4C:
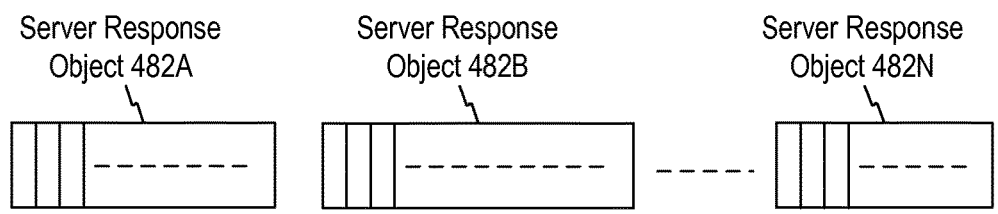
FIG. 4C is a block diagram illustrating exemplary server response objects, consistent with embodiments of the present disclosure.
Figure 5A:
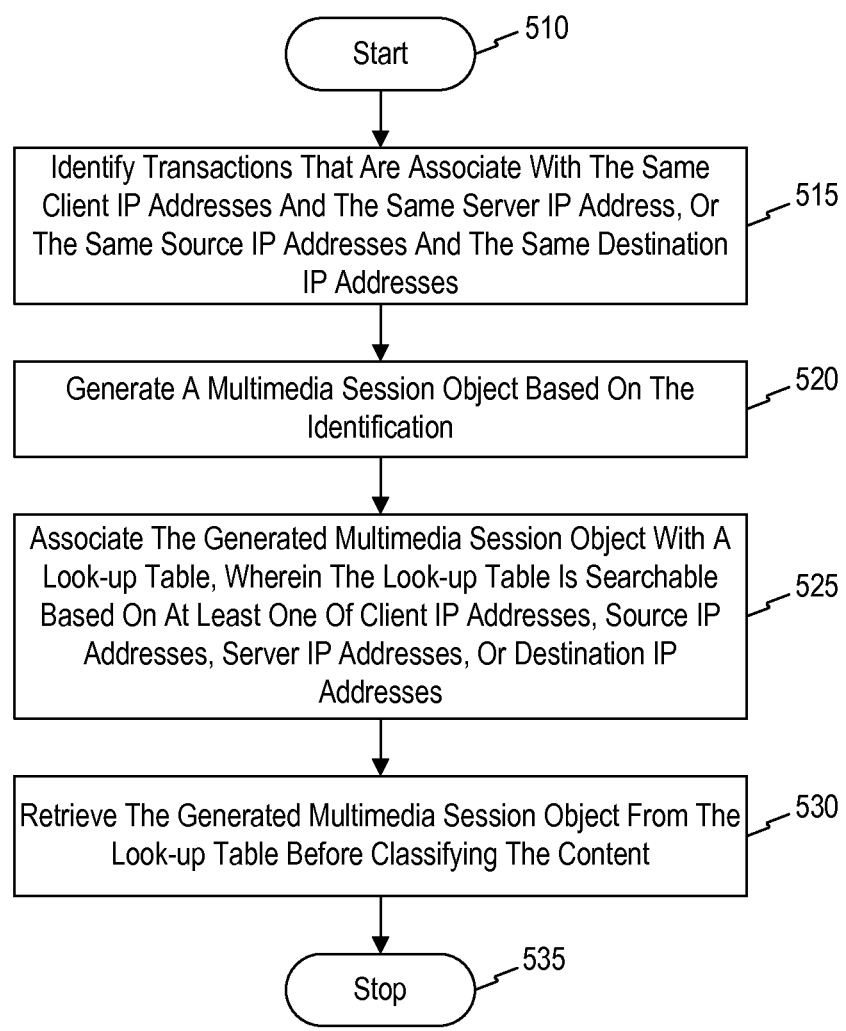
FIG. 5A is a flowchart representing an exemplary method for generating and retrieving a multimedia session object, consistent with embodiments of the present disclosure.
Figure 5B:
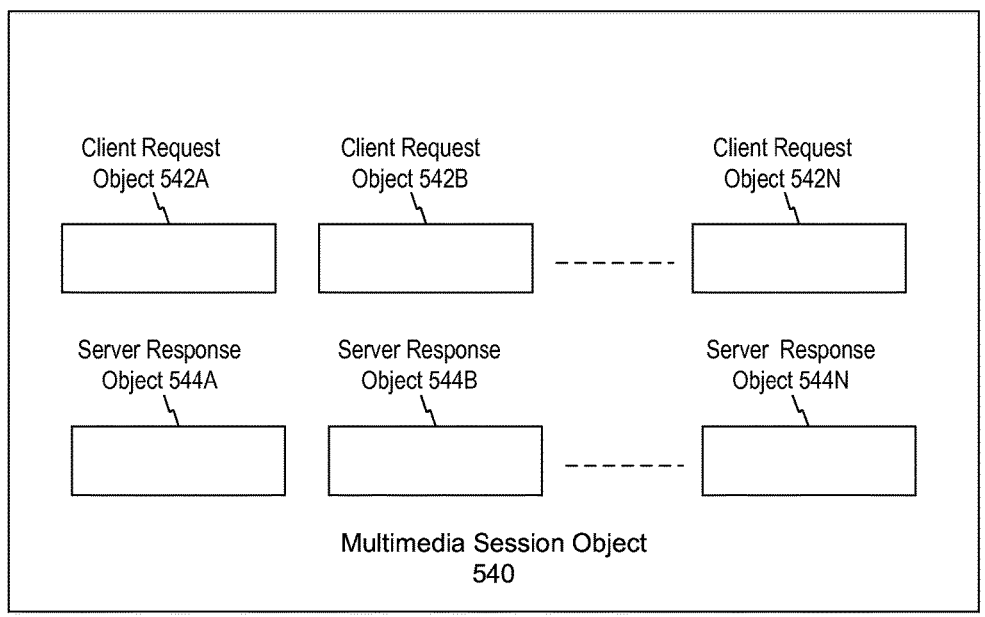
FIG. 5B is a block diagram illustrating an exemplary multimedia session object, consistent with embodiments of the present disclosure.
Figure 5C:
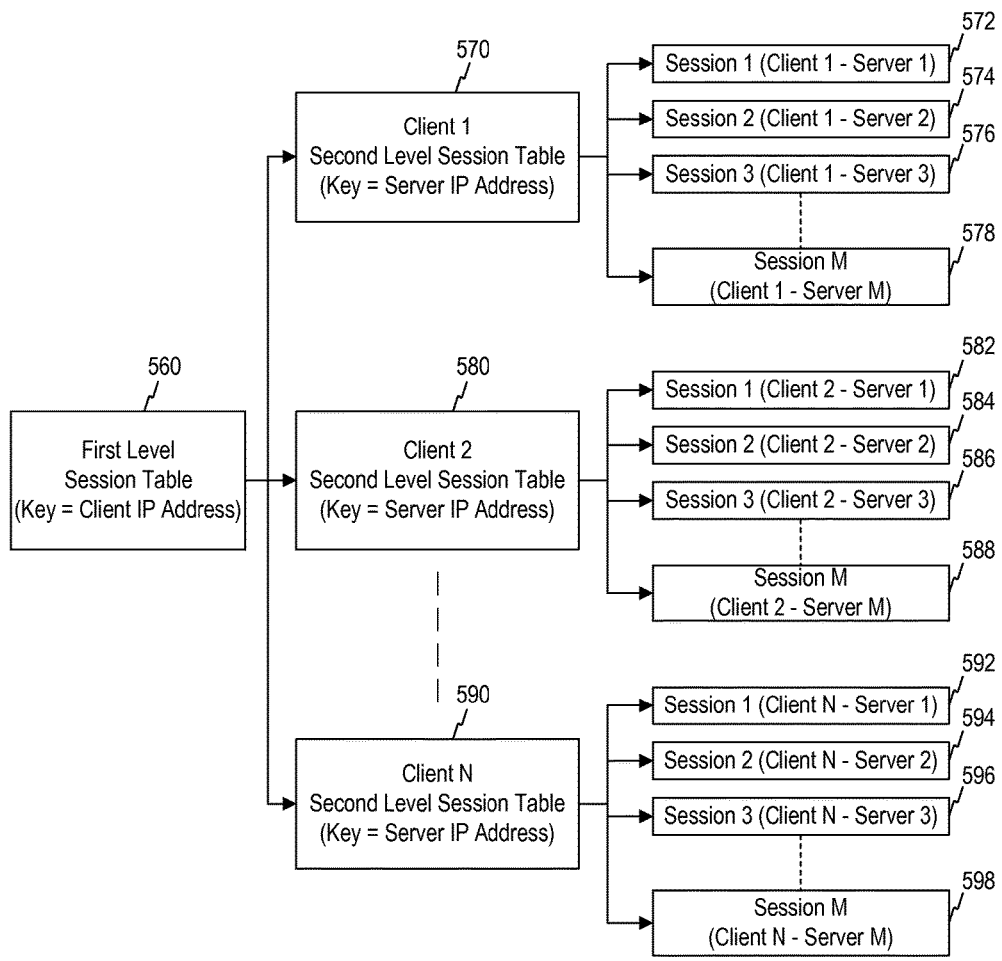
FIG. 5C is an exemplary diagram illustrating an exemplary structure of a multimedia session object look-up table.
Figure 6:
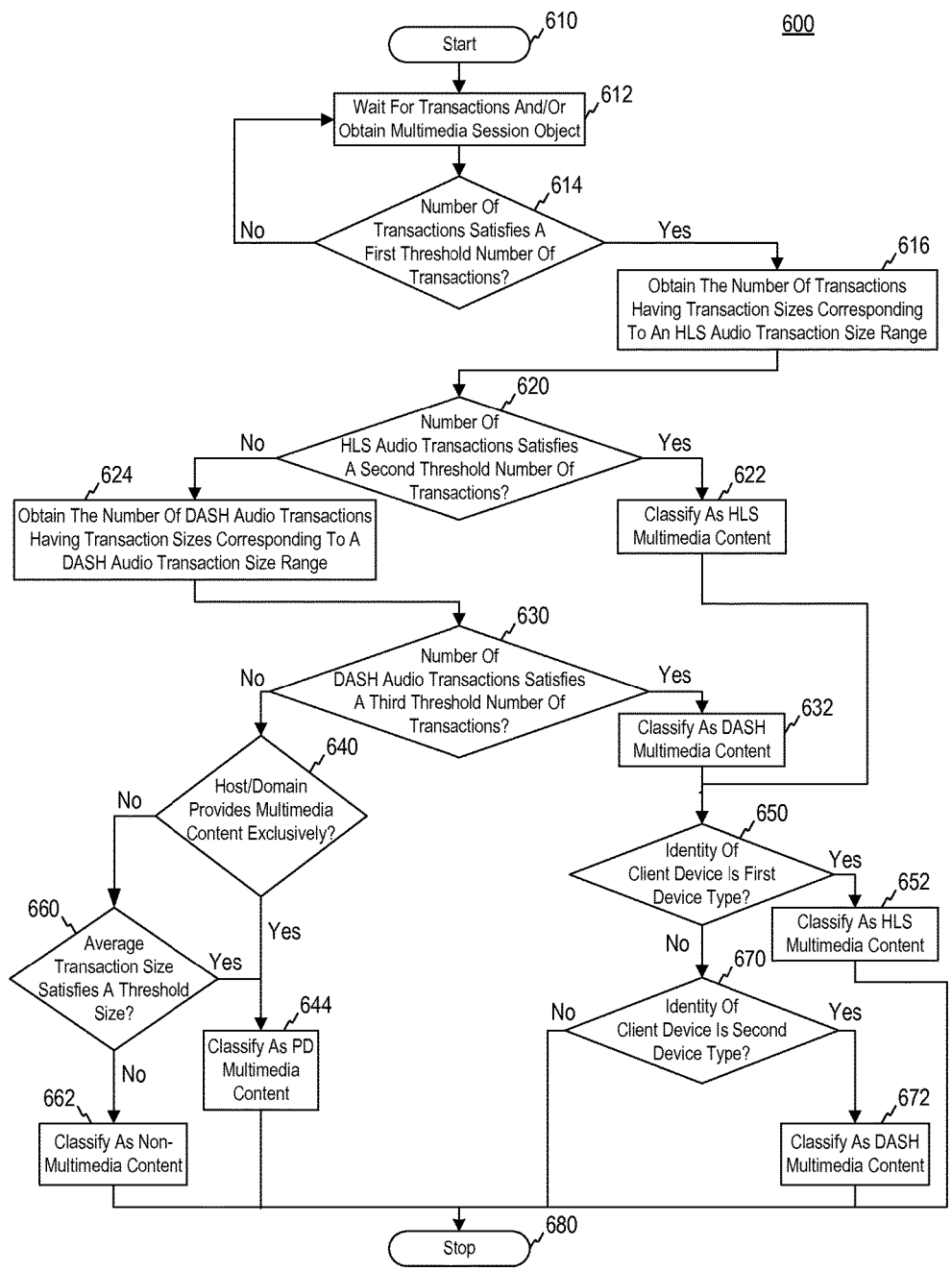
FIG. 6 is a flowchart representing an exemplary method for classifying content, consistent with embodiments of the present disclosure.
Figure 7:
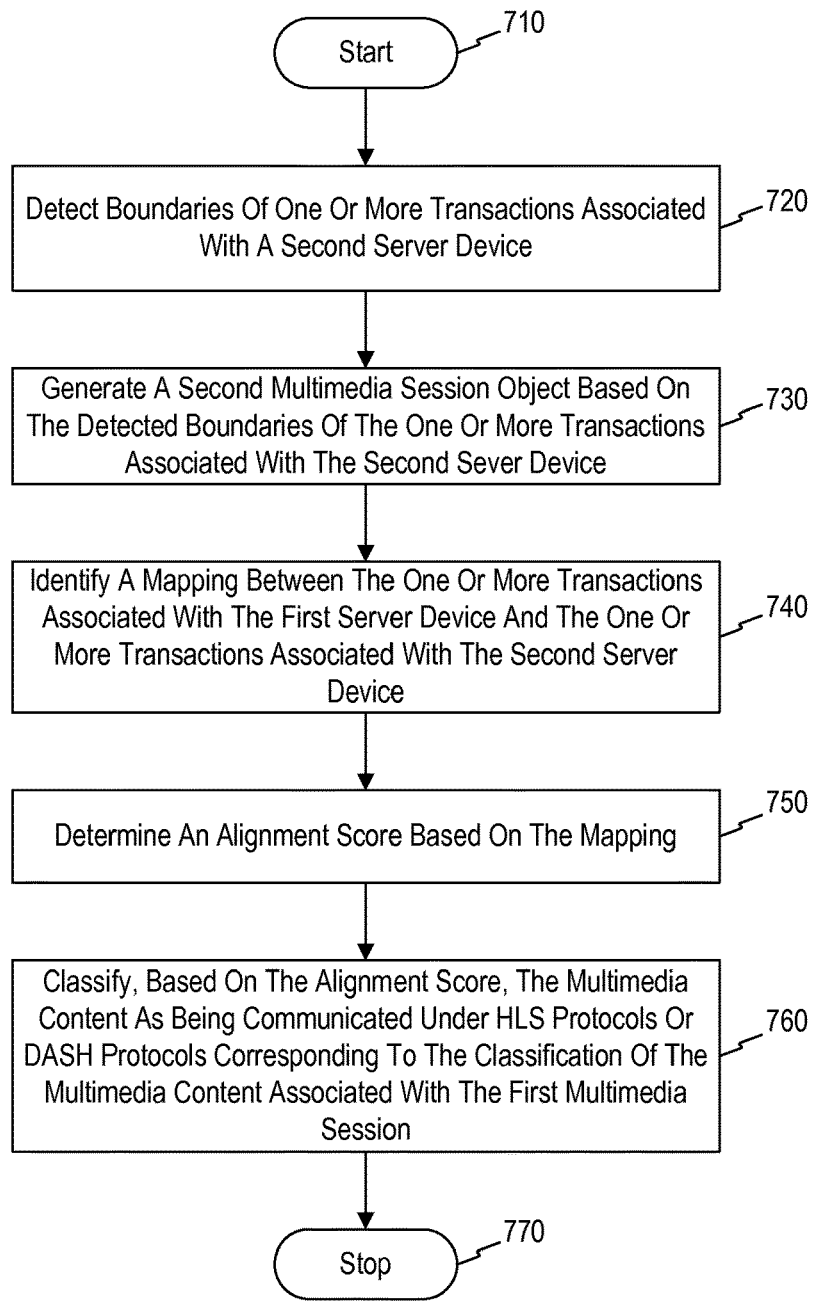
FIG. 7 is a flowchart representing an exemplary method for classifying content in a plurality of transactions associated with two or more servers, consistent with embodiments of the present disclosure.

In some embodiments, multimedia detector 224 can detect the presence of multimedia content in transactions. Transaction boundaries detector 226 can detect boundaries of the one or more transactions, as illustrated in FIGS. 4A-4C. Transaction identifier 228 can identify specific transactions in the transactions based on the sizes of the specific transactions. Multimedia session generator 230 can generate a multimedia session object based on the detected boundaries of the one or more transactions, as illustrated in FIGS. 5A-5C. Multimedia classifier 232 can classify, based on the number of transactions indicated by the multimedia session object, the content as being communicated under: HLS protocols, DASH protocols, progressive download protocols, or non-multimedia protocols, as illustrated in FIG. 6. Transaction aligner 234 can identify a mapping between transactions associated with a first server (e.g., server 260) and a second server (e.g., server 262), and determine an alignment score, as illustrated in FIG. 7. The operation of multimedia detector and classifier 220 and its components are further described using FIGS. 3-7 below.

Figure 3:
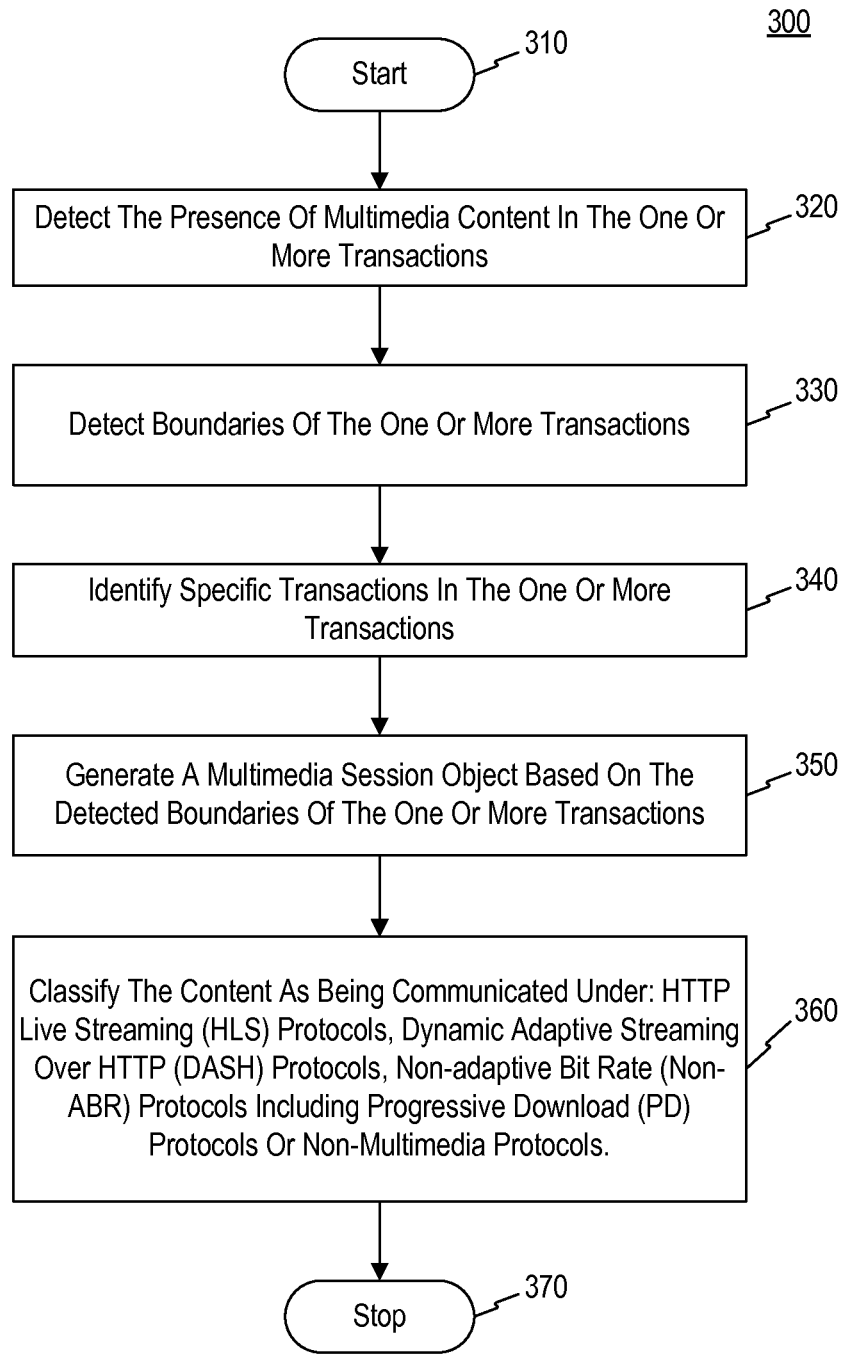
FIG. 3 is a flowchart representing an exemplary method for detecting and classifying content in unsecured or secured transactions, consistent with embodiments of the present disclosure.

FIG. 3 is a flowchart representing an exemplary method 300 for detecting and classifying content in one or more transactions, consistent with embodiments of the present disclosure. Referring to FIG. 3, it will be readily appreciated that the illustrated procedure can be altered to delete steps or further include additional steps. Method 300 can be performed by adaptive traffic manager 130, and more particularly by multimedia detector and classifier 220 of the adaptive traffic manager 130. While method 300 is described as being performed by multimedia detector and classifier 220, it is appreciated that other components of adaptive traffic manager 130 or other devices can be involved. Further, it is appreciated that any other adaptive traffic manager can also perform method 300.

Referring to FIG. 3, multimedia detector and classifier 220, and more particularly multimedia detector 224 of multimedia detector and classifier 220 can detect (step 320) the presence of multimedia content in secured transactions, such as SSL/TLS transactions, or unsecured transactions. In some embodiments, multimedia detector 224 can acquire one or more handshake messages associated with a secured connection for transmitting content between client 210 and server 260. A secured connection can include a plurality of secured transactions for transmitting content. For example, multimedia content (e.g., a video clip or session) can be transmitted over several HTTP transactions and can use one or more transmission control protocols (TCP) connections. After establishing the TCP connection, if the multimedia content are required to be encrypted, one or more secure tunnels between client 210 and server 260 can be established using SSL or TLS protocols. After establishing of the secure tunnels, all transactions between client 210 and server 260 are encrypted and thus secured.

Referring back to FIG. 2, to establish a secure tunnel, one or more handshake messages, such as SSL/TLS handshake messages, can be transmitted between client 210 and server 260. In some embodiments, multimedia detector 224 can detect the presence of multimedia content in secured transactions based on the handshake messages. For example, multimedia detector 224 can determine the server name, the source/destination name, or the host and domain name (e.g., www.youtube.com) associated with the secured transactions. Multimedia detector 224 can detect the presence of the multimedia content in the secured transactions based at least in part on the determined server name, source/destination name, or host and domain name. For example, if the domain name indicates that the identification of the host is youtube.com, it is likely that multimedia content (e.g., a YouTube video) is present in the secured transactions.

In some embodiments, multimedia detector 224 can also detect the presence of multimedia content in secured transactions based on the meta-data associated with a connection that corresponds to an established multimedia session. For example, after a secured connection (e.g., a SSL/TSL connection) is first established, adaptive traffic manager 130 can store the meta-data associated with such connection (e.g., the host name or domain name) in a look-up table. Adaptive traffic manager 130 can search the look-up table based on a session identification (ID) that identifies a current session in the established connection.

A current session can be a multimedia session that includes, for example, one or more single video clip, one or more episodes, one or more full-length movie, or any videos provided at a multimedia website (e.g., YouTube). In some embodiment, each session is associated with a session ID in the look-up table. A session can be interrupted or idle for a period of time, and be resumed at a later time. As an example, a multimedia session can provide a first movie and a second movie. The session ID associated with the connection that provides the first movie can be stored in a look-up table. The multimedia session can have an idle time interval between the first movie and a second movie. After the multimedia session resumes for the second movie, multimedia detector 224 can retrieve the session ID of the current session from the meta-data associated with the current session. Based on the session ID, multimedia detector 224 can search the look-up table to determine whether the session ID of the current session is associated with a connection of one or more previously established multimedia sessions. If multimedia detector 224 determines that the session ID of the current session is associated with such connection, multimedia detector 224 can determine that it is likely that multimedia content (e.g., a YouTube video) is present in the current session.

In some embodiments, multimedia detector 224 can detect the presence of multimedia content based on one or more IP addresses associated with one or more multimedia providing websites. For example, if multimedia detector 224 determines that the secured transactions are associated with a server/destination IP address of a known video providing website, it can determine that multimedia content (e.g., a YouTube video) is likely present in the secured transactions. The detection of the presence of multimedia content is described in more detail in related U.S. patent application Ser. No. 14/503,274 filed on Sep. 30, 2014.

As discussed above, a single TCP connection can carry one or more transactions such as HTTP transactions. The one or more transactions can include one or more requests from client 210 and one or more corresponding responses from server 260. Referring to FIG. 3, multimedia detector and classifier 220, and more particularly transaction boundaries detector 226, can detect (step 330) the boundaries of one or more transactions between client 210 and server 260. The operation of transaction boundaries detector 226 is described in more detail using FIGS. 4A-4C.

FIG. 4A is a flowchart representing an exemplary method 400 for detecting transaction boundaries, consistent with embodiments of the present disclosure. Referring to FIG. 4A, it will be readily appreciated that the illustrated procedure can be altered to delete steps or further include additional steps. Method 400 can be performed by adaptive traffic manager 130, and more particularly by transaction boundaries detector 226 of the adaptive traffic manager 130.

While method 400 is described as being performed by transaction boundaries detector 226, it is appreciated that other components of adaptive traffic manager 130 or other devices can be involved. Further, it is appreciated that any other adaptive traffic manager can also perform method 400.

Referring to FIG. 4A, after an initial step 410, transaction boundaries detector 226 can wait (step 411) for more data, e.g., request data or response data, from client 210 or server 260. After transaction boundaries detector 226 receives more data, it can determine (step 412) whether a connection is closed. As described above, adaptive traffic manager 130 can receive data from client 210 and/or server 260. Content can be transmitted over a plurality of transactions using, for example, a TCP connection. If transaction boundaries detector 226 determines that a connection is closed, transaction boundaries detector 226 can close (step 414) any active request object and/or any active response object, and proceed to a stop 460. A request object is also referred to as a client request object and a response object is also referred to as a server response object. Request objects can store data representing client requests and response objects can store data representing server responses.

Referring back to FIG. 2, transaction boundaries detector 226 can generate request objects representing client requests provided by client 210 and generate response objects representing server responses provided by server 260. FIG. 4B is a block diagram 470 illustrating an exemplary plurality of client request objects 472A, 472B, . . . 472N (collectively called client request objects 472) representing client requests. To generate client request objects 472, transaction boundaries detector 226 can acquire request data included in the one or more client requests. Similarly, FIG. 4C is a block diagram 480 illustrating an exemplary plurality of server response objects 482A, 482B, . . . 482N (collectively called server response objects 482) representing server responses. To generate server response objects 482, transaction boundaries detector 226 can acquire response data included in the one or more server responses.

The request object and the response object can be any record, pointer, or data structure stored on a hardware and/or software-based data storage device, for example, data storage 236. For example, the content of the request objects and response objects can be stored as records or indexes in a single data structure or the content of each request object and response object can be recorded in a separate transaction list data structure.

Referring to FIGS. 4B-4C, transaction boundaries detector 226 can also associate request data with corresponding request objects and associate response data with corresponding response objects. As described above, a transaction can include one or more requests from client 210 and one or more corresponding responses from server 260. In some embodiments, server 260 (e.g., an HTTP content server) can wait for client 210 to provide an entire request before it provides a response. The entire request can include one or more request data. Similarly, client 210 can wait for server 260 to provide an entire response before it provides a subsequent request. The entire response can include one or more response data. Transaction boundaries detector 226 can associate the one or more request data to the corresponding request object and associate the one or more response data to the corresponding response object. Based on the request objects and response objects, transaction boundaries detector 226 can detect transaction boundaries, which is further described in detail below.

Referring to FIG. 4A, in step 412, if transaction boundaries detector 226 determines that a connection (e.g., a TCP connection) is not closed, it can wait for data to be received from client 210 or server 260 and further determine (step 416) whether the idle time interval for receiving data is greater than a preconfigured idle time threshold. If the idle time interval for receiving data is greater than or equal to the idle time threshold, transaction boundaries detector 226 can close (step 418) any active request object and/or any active response object. In some embodiments, an idle time interval that is greater than or equal to the idle time threshold can indicate that the content received after the elapse of the idle time is associated with another session. For example, if the idle time interval between two consecutive videos is greater than a session idle time threshold (e.g., thirty seconds), the two consecutive videos can be represented in two multimedia sessions. As a result, any active client request objects and server response objects in the current session can be closed.

As shown in FIG. 4A, in step 416, if transaction boundaries detector 226 determines that the idle time interval for receiving data is less than a preconfigured idle time threshold, it can acquire (step 420) the data, which can be request data included in the one or more client requests from client 210 or response data included in the one or more corresponding server responses from server 260. After acquiring the data, transaction boundaries detector 226 can determine (step 422) whether the acquired data is request data or response data.

In step 422, if transaction boundaries detector 226 determines that the acquired data is request data, it further determines (step 424) whether an active request object is open. As described above, a request object can be any record, pointer, or data structure stored on a hardware and/or software-based data storage device, for example, data storage 236. A request object can store request data provided by client 210. In some embodiments, transaction boundaries detector 226 can generate an active request object after it receives the first request data from client 210. If an active request object is open, transaction boundaries detector 226 can associate additional request data to the active request object. If no active request object is open, transaction boundaries detector 226 can generate an active request object to store the acquired request data.

Referring to FIG. 4A, if transaction boundaries detector 226 determines (step 424) that an active request object is open, it can associate (step 432) the acquired request data to the active request object. In some embodiments, transaction boundaries detector 226 can determine that no active request object is open and generate (step 426) an active request object. As an example, transaction boundaries detector 226 can determine that no active request object is open because the request data that transaction boundaries detector 226 received is the first request data provided by client 210. As another example, transaction boundaries detector 226 can determine that no active request object is open because an active request object is closed before transaction boundaries detector 226 received the request data. As shown in FIG. 4A, if no active request object is open, transaction boundaries detector 226 can generate (step 426) an active request object.

Referring to FIG. 4A, in some embodiments, after generating an active request object, transaction boundaries detector 226 can determine (step 430) whether an active response object is open. As described above, a response object can be any record, pointer, or data structure stored on a hardware and/or software-based data storage device, for example, data storage 236. A response object can store response data provided by, for example, server 260.

As shown in FIG. 4A, if transaction boundaries detector 226 determines (step 430) that no active response object is open, it can associate (step 432) the acquired request data with the active request object. As shown in FIG. 4A, if transaction boundaries detector 226 determines (step 430) that an active response object is open, it can close (step 434) the active response object. The active request object and the active response object can represent one or more client requests and one or more server responses in a single transaction, respective. Thus, any subsequent request data or response data can represent subsequent client requests or subsequent server responses, respectively, in subsequent transactions. In some embodiments, transaction boundaries detector 226 can close the current active response object for properly associate the subsequent client request data with a subsequent transaction.

After closing the active response object, transaction boundaries detector 226 can associate (step 432) the acquired request data to the active request object. The active request object represents client request in a subsequent transaction.

Referring back to step 422, transaction boundaries detector 226 can determine whether the acquired data is request data or response data. If the acquired data is not request data and is response data, transaction boundaries detector 226 can determine (step 440) whether an active response object is open. If an active response object is open, transaction boundaries detector 226 can associate (step 442) the acquired response data with the active response object, where the acquired response data represent the server response to a prior client request.

In some embodiments, after associating the acquired response data with the active response object, transaction boundaries detector 226 can associate (not shown) any additional response data to the active response object if the additional response data are received before subsequent request data are received from client 210. In some embodiments, after associating the acquired response data with the active response object, transaction boundaries detector 226 can close the active response object if subsequent request data is received from client 210; if an idle time for receiving data is greater than or equal to an idle time threshold; or if the connection for transmitting content between client 210 and server 260 is closed. A closed active response object and its corresponding request object can represent one or more server responses and one or more client requests in a single transaction.

In step 440, if transaction boundaries detector 226 determines that no active response object is open, transaction boundaries detector 226 can further determine (step 444) whether an active request object is open. If no active request object is open, it indicates that the acquired response data do not represent a server response to a corresponding client request, and thus are not part of a transaction. As a result, transaction boundaries detector 226 can discard (step 446) the acquired response data.

In step 440, if transaction boundaries detector 226 determines that an active response object is open, it indicates that the acquired response data represents a server response to a corresponding client request, and thus are part of a transaction including the client request. As a result, transaction boundaries detector 226 can close (step 448) the active request object, generate (step 450) an active response object, and associate (step 452) the acquired response data to the active response object. The closed request object and the active response object represent client requests and server responses, respectively, in a single transaction.

As shown in FIG. 4A, after transaction boundaries detector 226 performs steps 432, 442, 446, or 452, it can repeat method 400 for processing more data by, for example, go back to step 411. It is appreciated that transaction boundaries detector 226 can repeat method 400 such that one or more client requests are associated with one or more request objects, and one or more server responses are associated with response objects.

Based on the request objects and the response objects, transaction boundaries detector 226 can detect the transaction boundaries. For example, a transaction can include one or more client requests represented by a request object and one or more server responses represented by a response object corresponding to the request object. Thus, a transaction can be represented by a request object and a corresponding response object. In a transaction, one or more current server responses correspond to one or more prior client requests. As a result, client requests that are subsequent to the one or more current server responses can indicate the beginning of a subsequent transaction.

Referring back to FIG. 3, after transaction boundaries detector 226 detects (step 330) boundaries of transactions, adaptive traffic manager 130, and more particularly transaction identifier 228, can identify (step 340) one or more specific transactions based on the sizes of the specific transactions. For example, transaction identifier 228 can estimate the size of a particular transaction, the size of a request object representing the client requests associated with the particular transaction, and/or the size of a response object representing the server responses associated with the particular transaction.

In some embodiments, transaction identifier 228 can determine whether the size of the response object in the particular transaction is less than a response object size threshold. The response object size threshold can be, for example, 4 Kbytes. If the size of the response object is less than the response object size threshold, transaction identifier 228 can identify the particular transaction as a specific transaction, such as a small transaction. In some embodiments, specific transactions, such as small transactions are excluded when the transactions are classified. More details of classifying the transactions are described below.

Referring to FIG. 3, adaptive traffic manager 130, and more particularly multimedia session generator 230, can generate (step 350) a multimedia session object based on the detected boundaries of the one or more transactions. The multimedia session object can include one or more request objects and one or more corresponding response objects. In some embodiments, the multimedia session object can provide an indication of the number of transactions for communicating the content associated with a multimedia session between client 210 and server 260. An exemplary operation of multimedia session generator 230 is described in more detail using FIGS. 5A-5C.

FIG. 5A is a flowchart representing an exemplary method 500 for generating a multimedia session object, consistent with embodiments of the present disclosure. Referring to FIG. 5A, it will be readily appreciated that the illustrated procedure can be altered to delete steps or further include additional steps. Method 500 can be performed by adaptive traffic manager 130, and more particularly by multimedia session generator 230 of the adaptive traffic manager 130. While method 500 is described as being performed by multimedia session generator 230, it is appreciated that other components of adaptive traffic manager 130 or other devices can be involved. Further, it is appreciated that any other adaptive traffic manager can also perform method 500.

Referring to FIG. 5A, after an initial step 510, multimedia session generator 230 can identify (step 515), based on the detected boundaries of the one or more transactions, transactions that are associated with the same client IP addresses and the same server IP address, or the same source IP addresses and the same destination IP addresses. In some embodiments, transactions that are associated with the same client IP addresses and the same server IP address can be included in a single multimedia session. Similarly, transactions that are associated with the same source IP addresses and the same destination IP addresses can be included in a single multimedia session.

In some embodiments, after client 210 and server 260 has established a secured or unsecured connection for transmitting multimedia content, multimedia session generator 230 can generate (step 520) a multimedia session object, which can represent a multimedia session. A multimedia session object can be any record, pointer, or data structure stored on a hardware and/or software-based data storage device, for example, data storage 236. For example, the contents of the multimedia session object can be stored as records or indexes in a single data structure or the contents of each multimedia session object can be recorded in a separate transaction list data structure.

In some embodiments, multimedia session generator 230 can associate one or more request objects and one or more corresponding response objects with a multimedia session object. FIG. 5B is a block diagram illustrating an exemplary multimedia session object 540 associated with multiple request objects 542A-N, and multiple response objects 544A-N. For example, during a particular multimedia session, transaction boundaries detector 226 can generate a plurality of (e.g., five) requests objects and a plurality of (e.g., five) response objects. If multimedia session generator 230 identifies that the client requests represented by requests objects 542A-N are associated with the same client IP address and identifies that the server responses represented by response objects 544A-N are associated with the same server IP address, multimedia session generator 230 can associate the request objects and the corresponding response objects with a single multimedia session object 540. Therefore, multimedia session object 540 can provide an indication of the number of transactions (e.g., five) for communicating the content associated with a multimedia session between client 210 and server 260.

Referring back to FIG. 5A, after generating the multimedia session object, multimedia session generator 230 can associate (step 525) the multimedia session object, which represents a corresponding multimedia session, with a look-up table. The look-up table can be searchable based on a client/source IP address, a server/destination IP address, or a concatenation of the client/source and server/destination IP addresses. FIG. 5C is an exemplary diagram illustrating an exemplary structure of a multimedia session object look-up table 550.

As shown in FIG. 5C, multimedia session generator 230 can establish multimedia session object look-up table 550, e.g., a two level look-up table. In look-up table 550, the first level can be searchable using client/source IP addresses and the second level can be searchable using server/destination IP addresses. For example, multimedia session object look-up table 550 can have a first level session table 560 that includes a plurality of client/source IP addresses. Each client/source IP address identifies a client (e.g., client 210) or the source of requests for content. For associating a multimedia session object to multimedia session object look-up table 550, multimedia session generator 230 can search first level session table 560 using the client/source IP address of transactions represented by the multimedia session object.

Based on the search result, multimedia session generator 230 can identify a second level session table. For example, as shown in FIG. 5C, if the multimedia session object includes client request objects that represent client requests provided by client 1, multimedia session generator 230 can use the IP address of client 1 to search first level session table 560. Based on the search results, multimedia session generator 230 can identify second level session table 570.

Referring to FIG. 5C, multimedia session object look-up table 550 can have one or more second level session tables 570, 580, and 590, corresponding to each client/source IP addresses. For example, second level session tables 570, 580, and 590 corresponds to IP addresses associated with client 1, client 2, and client N, respectively. As a result, each second level session table includes a plurality of server/destination IP addresses identifying servers or destinations that communicates with a different client (e.g., clients 1, 2, . . . N).

After searching first level session table 560, multimedia session generator 230 can further search a second level session table using a server/response IP address of transactions represented by the multimedia session object. Based on the search result, multimedia session generator 230 can associate the multimedia session object with a second level session table. For example, if the multimedia session object includes server response objects that represent responses provided by server 1, multimedia session generator 230 can use the IP address of server 1 to search second level session table 570.

As described above, a multimedia session object represents a multimedia session that includes transactions between the same client/source and the same server/destination. As a result, based on the search results of second level session table 570, multimedia session generator 230 can associate one or more multimedia session objects with look-up table 550 using their server/destination IP addresses. For example, if multimedia session objects 572, 574, 576, and 578 represent multimedia sessions having transactions between client 1 and server 1, server 2, server 3, and server M, respectively, multimedia session generator 230 can associate each of these multimedia session objects as a separate entry with second level session table 570. Similarly, if multimedia session objects 582, 584, 586, and 588 represent multimedia sessions having transactions between client 2 and server 1, server 2, server 3, and server M, respectively, multimedia session generator 230 can associate each of these multimedia session objects as a separate entry with second level session table 580, and so forth.

Referring to FIG. 5A, multimedia session generator 230 can also retrieve (step 530) a multimedia session object from a look-up table before classifying the content included in a corresponding multimedia session. For example, as shown in FIG. 5C, if the content of a multimedia session represented by multimedia session object 572 is to be classified, multimedia session generator 230 can retrieve multimedia session object 572 based on its client/source IP address and its server/destination IP address. Using the client/source IP address associated with multimedia session object 572, multimedia session generator 230 can search first level session table 560 to identify second level session table 570. Using the server/destination IP address associated with multimedia session object 572, multimedia session generator 230 can search second level session table 570 to identify multimedia session object 572. Based on the identification, multimedia session generator 230 can retrieve multimedia session object 572 for classifying the content of the multimedia session represented by multimedia session object 572. As shown in FIG. 5A, after retrieving the multimedia session object for classification, method 500 can proceed to a stop. It is appreciated that method 500 can also be repeated for generating additional multimedia session objects, associating the additional multimedia session objects with look-up table 550, and retrieving the additional multimedia session objects for classification.

Referring back to FIG. 3, after multimedia session generator 230 generates the multimedia session objects, adaptive traffic manager 130, and more particularly multimedia classifier 232, can classify (step 360) the content associated with multimedia sessions represented by the multimedia session objects. An exemplary operation of multimedia classifier is described in more detail using FIG. 6.

FIG. 6 is a flowchart representing an exemplary method 600 for classifying content associated with a multimedia session represented by a multimedia session object, consistent with embodiments of the present disclosure. Referring to FIG. 6, it will be readily appreciated that the illustrated procedure can be altered to delete steps or further include additional steps. Method 600 can be performed by adaptive traffic manager 130, and more particularly by multimedia classifier 232 of the adaptive traffic manager 130. While method 600 is described as being performed by multimedia classifier 232, it is appreciated that other components of adaptive traffic manager 130 or other devices can be involved. Further, it is appreciated that any other adaptive traffic manager can also perform method 600.

As shown in FIG. 2, in some embodiments, multimedia classifier 232 can classify the content in secured or unsecured transactions as being communicated under: HLS protocols, DASH protocols, progressive download protocols, or non-multimedia protocols. HLS protocols and DASH protocols are examples of adaptive bit-rate protocols. Adaptive bit-rate protocols differ from the progressive download protocols in several aspects, including, for example, the behavior at the beginning of the transmission of the content. In some embodiments, under the adaptive bit-rate protocols, during the beginning of the transmission (e.g., a few seconds), client 210 can estimate the channel bandwidth and dynamically change the quality level of the content. As an example, if the current quality level is low (e.g., 240p) and client 210 determines that the available bandwidth is enough to increase the quality level by one or more resolution steps, client 210 can request to increase quality level (e.g., to 720p) in subsequent messages it sends to server 260. As another example, if client 210 determines that the current available bandwidth is not enough to support the current quality level (e.g., 1080p) associated with the multimedia content, client 210 can request to decrease the quality level (e.g., to 720p) in subsequent messages it sends to server 260.

As discussed above, under the adaptive bit-rate protocols, client 210 can request to change (increase or decrease) the multimedia quality levels. In some embodiments, at least partially due to such changes, the number of transactions during the beginning period of transmitting the multimedia content under the adaptive bit-rate protocols can be greater than the number of transactions under the progressive download protocols. As stated above, under the progressive download protocols, client 210 does not request to change the quality level; accordingly, the multimedia content is transmitted from server 260 using a single quality level. As such, the number of transactions in the transmission under the progressive download protocols can be smaller (e.g., one transaction) than the number of transactions in the transmission under the adaptive bit-rate protocols. Moreover, sizes of the transactions in communications under the HLS protocols, DASH protocols, progressive download protocols, or non-multimedia protocols can be different. As a result, multimedia classifier 232 can classify the content in secured or unsecured transactions based on the number of transactions and/or based on the sizes of transactions.

Referring to FIG. 6, after an initial step 610, multimedia classifier 232 can wait for transactions and/or obtain (step 612) a multimedia session object, which represents a multimedia session. For example, multimedia classifier 232 can wait for one or more client request objects representing client requests and/or one or more server response objects representing server responses to be associated with the multimedia session object. As described above, client request objects and server response objects can be associated to one or more multimedia session objects based on their client/source IP addresses and server/destination IP addresses. After such association, the multimedia session objects can be inserted into a look-up table. Multimedia classifier 232 can obtain a multimedia session object by, for example, retrieving the multimedia session object from a look-up table.

After multimedia classifier 232 obtains the multimedia session object, it can determine (step 614) the relation of the number of transactions associated with the multimedia session object with respect to a first threshold number of transactions. As described above, a multimedia session object (e.g., multimedia session object 540) represents a multimedia session having one or more transactions. Each transaction can include, for example, one client request and one corresponding server response. A multimedia session object can thus include one or more client request objects (e.g., client request objects 542) representing client requests and one or more corresponding server responses objects (e.g., server response objects 544) representing server responses. As a result, a multimedia session object can provide the indication of the number of transactions using the number of client request objects and the number of server response objects. For example, if a multimedia session object includes five client request objects and five server response objects, the number of transactions is five for the multimedia session represented by the multimedia session object.

The first threshold number of transactions can be, for example, four or six. As described above, the number of transactions in communications under the adaptive bit-rate protocols, such as the HLS or DASH protocols can be greater than the number of transactions in communications under the progressive download protocols or non-multimedia protocols. Therefore, if the number of transactions associated with the multimedia session object is greater than or equal to a first threshold number of transactions (e.g., four transactions or six transactions), the transactions are likely communicated under the adaptive bit-rate protocols. As a result, multimedia classifier 232 can further determine, in the subsequent steps, whether the transactions are communicated under the HLS protocols or the DASH protocols.

In some embodiments, if the number of transactions associated with the multimedia session object is less than the first threshold number of transactions (e.g., four transactions), multimedia classifier 232 can wait for a period of time to allow more client request objects and/or more server response objects to be associated with the multimedia session object. Multimedia classifier 232 can obtain the updated multimedia session object and determine again the relation of the number of transactions associated with the multimedia session object with respect to the first threshold number of transactions.

Referring to FIG. 6, if the number of transactions associated with the multimedia session object is greater than or equal to the first threshold number of transactions, multimedia classifier 232 can obtain (step 616) the number of transactions that have sizes corresponding to an HLS audio transaction size range. In some embodiments, a transaction can be a video transaction or an audio transaction. A server response in a video transaction can include video data and a server response in an audio transaction can include audio data. The server response can be represented by a server response object.

For a particular multimedia session, multimedia classifier 232 can obtain the sizes of the transaction using the server response objects and/or client request objects included in the multimedia session object that represents the multimedia session. The size of a response can include, for example, the size of the video or audio content provided by server 260. Additionally, the size of a response can also include the size of headers (e.g., HTTP headers) and the size of other overheads due to, for example, SSL/TLS encryptions. In some embodiments, the size of the response can be much greater than the sizes of the headers and other overheads. To account for the headers and overheads, a size range can be used to indicate the size of a transaction. Moreover, the size of a transaction can include the size of a server response and a size of a client request. In some embodiments, the transaction size is predominated by the response size. As such, the size range can also be used to indicate the size of a transaction by taking into account the size of a client request.

The ranges of audio transaction sizes or video transaction sizes can be different for different quality levels (e.g., bitrates) and for different types of protocols. For example, for transactions communicated under the HLS protocols, the size ranges of audio transactions can have ranges of 28,597-33,899 bytes, 58,697-67,271 bytes, and 78,097-89,515 bytes, corresponding to audio bitrates of 48 Kbps, 96 Kbps, and 128 Kbps.

In some embodiments, the number of different size ranges of video or audio transactions can be limited. For example, for transactions communicated under the HLS protocols by YouTube™, the media time length in a single video or audio transaction can be fixed (e.g., 5 seconds). As a result, the number of different size ranges of transactions communicated under the HLS protocols by YouTube™ can also be limited. As an example, the audio transactions communicated under the HLS protocols by YouTube™ have a limited number of size ranges, e.g., 28,597-33,899 bytes, 58,697-67,271 bytes, and 78,097-89,515 bytes corresponding to the three audio bitrates of 48 Kbps, 96 Kbps, and 128 Kbps.

Multimedia classifier 232 can obtain the number of transactions that have sizes corresponding to the size ranges of HLS audio transactions. For example, using a multimedia session object, multimedia classifier 232 can obtain the size of each transaction associated with the multimedia session object. Multimedia classifier 232 can compare the size of each transaction with each of the size ranges of HLS audio transactions to determine whether the size of each transaction falls within a size range of HLS audio transactions. Based on the determination, multimedia classifier 232 can obtain the number of transactions having transaction sizes that fall within the size ranges of HLS audio transactions.

Referring to FIG. 6, multimedia classifier 232 can determine (step 620) the relation of the number of a first type transactions (e.g., HLS audio transactions) with respect to a second threshold number of transactions. In some embodiments, if the number of the first type transactions satisfies the second threshold number of transactions, multimedia classifier 232 can classify (step 622) the content associated with the multimedia session represented by the multimedia session object as being communicated under the HLS protocols. For example, the second threshold number of transactions can be two or three. Thus, if the number of HLS audio transactions is greater than or equal to two or three, multimedia classifier 232 classifies the content associated with the corresponding multimedia session as being communicated under the HLS protocols.

In some embodiments, after multimedia classifier 232 classifies the content as being communicated under the HLS protocols, multimedia classifier 232 can proceed to steps 650, 652, 670, and/or 672 to further determine, based on the identity of client 210, whether the content associated with the corresponding multimedia session is being communicated under the HLS protocols or the DASH protocols. Such further determination can be required because the transaction size ranges of certain transactions overlap between the HLS protocols and the DASH protocols. For example, one transaction size of an audio HLS transaction is 58,697-67,271 bytes corresponding to the 96 Kpbs bitrate with a 5-second media time length; and one response size of an audio DASH transaction is 65,512-66,540 bytes corresponding to the 128 Kpbs bitrate with a 5.5-second media time length. Therefore, these two size ranges overlap and further determination can be required. Steps 650, 652, 670, and 672 are described in more detail below.

Referring to FIG. 6, if the number of the first type transactions does not satisfy the second threshold number of transactions, multimedia classifier 232 can obtain (step 624) the number of audio transactions having transactions sizes corresponding to a DASH audio transaction size range. As discussed above, the number of different size ranges of video or audio transactions can be limited. For example, for transactions communicated under the DASH protocols by YouTube™, the media time length in a single video or audio transaction can be fixed (e.g., 5.5 seconds, 10 seconds, or 20 seconds). As a result, the number of different size ranges of transactions communicated under the DASH protocols by YouTube™ can also be limited. As an example, the audio transactions communicated under the DASH protocols by YouTube™ have a limited number of size ranges as illustrated in Table 1 below.

TABLE 1

YouTube™ DASH audio transaction sizes.

| Audio Bitrate/Media Time Length | Response Size Low (bytes) | Response Size High (bytes) |
|---|---|---|
| 128 kbps/10 seconds | 155,339 | 162,412 |
| 96 kbps/10 seconds | 114,389 | 123,369 |
| 128 kbps/4 seconds or 96 kbps/5.5 seconds | 65,512 | 66,540 |
| 96 kbps/20 seconds | 237,426 | 246,642 |
| 128 kbps/20 seconds | 313,745 | 328,127 |

In some embodiments, multimedia classifier 232 can obtain the number of transactions that have transaction sizes corresponding to the size ranges of DASH audio transactions. For example, using a multimedia session object, multimedia classifier 232 can obtain the transaction size of each transaction associated with the multimedia session object. Multimedia classifier 232 can compare the transaction size of each transaction with each of the size ranges of DASH audio transactions to determine whether the transaction size of each transaction falls within a size range of DASH audio transactions (e.g., one of the size ranges shown in Table 1 above). Based on the determination, multimedia classifier 232 can obtain the number of transactions having transaction sizes that fall within the size ranges of DASH audio transactions.

Referring to FIG. 6, multimedia classifier 232 can determine (step 630) the relation of the number of a second type transactions (e.g., DASH audio transactions) with respect to a third threshold number of transactions. In some embodiments, if the number of the second type transactions satisfies the third threshold number of transactions, multimedia classifier 232 can classify (step 632) the content associated with the corresponding multimedia session represented by the multimedia session object as being communicated under the DASH protocols. For example, the third threshold number of transactions can be one or two. Thus, if the number of DASH audio transactions is greater than or equal to one or two, multimedia classifier 232 classifies the content associated with the corresponding multimedia session as being communicated under the DASH protocols.

In some embodiments, after multimedia classifier 232 classifies content as being communicated under the DASH protocols, multimedia classifier 232 can proceed to steps 650, 652, 670, and/or 672 to further determine, based on the identity of client 210, whether the content associated with the corresponding multimedia session is being communicated under the HLS protocols or the DASH protocols. As discussed above, further determination can be required because the transaction size ranges in certain transactions overlap between HLS protocols and DASH protocols. For example, one transaction size of an audio HLS transaction is 58,697-67,271 bytes corresponding to the 96 Kpbs bitrate with a 5-second media time length; and one transaction size of an audio DASH transaction is 65,512-66,540 bytes corresponding to the 128 Kpbs bitrate with a 5.5-second media time length. Therefore, these two size ranges overlap and further determination can be required.

Referring to FIG. 6, in step 650, multimedia classifier 232 can determine whether the identity of client 210 is a first device type (e.g., Apple® iOS devices such as iPad, iPhone, MacBook, etc.). If the identity of client 210 is the first device type, multimedia classifier 232 can classify (step 652) the content associated with the corresponding multimedia session as being communicated under the HLS protocols. If the identity of client 210 is not the first device type, multimedia classifier 232 can determine (step 670) whether the identity of client 210 is a second device type (e.g., Android® devices such as Nexus™ phones and tablets). If the identity of client 210 is the second device type, multimedia classifier 232 can classify (step 672) the content associated with the corresponding multimedia session as being communicated under the DASH protocols. If the identity of client 210 is not the second device type, method 600 can proceed to a stop 680.

Referring back to step 630 of FIG. 6, in some embodiments, if the number of the second type transactions (e.g., DASH audio transactions) does not satisfies the third threshold number of transactions (e.g., one or two transactions), multimedia classifier 232 can determine (step 640) whether the host or domain that provides the content associated with the transactions provide multimedia content exclusively. If the host or domain provides multimedia content exclusively, multimedia classifier 232 classifies (step 644) content associated with the corresponding multimedia session as being communicated under progressive download protocols. If the host or domain does not provide multimedia content exclusively, multimedia classifier 232 can determine (step 660) the relation of an average transaction size of the transactions associated with the multimedia session object with respect to a threshold size.

In some embodiments, for transactions communicating multimedia content, the average transaction size is typically greater than that of transactions communicating only non-multimedia content. Therefore, if the average transaction size of the transactions associated with the multimedia session object is greater than or equal to a threshold size (e.g., 1 MB or 2 MB), multimedia classifier 232 can classify (step 644) the content associated with the corresponding multimedia session represented by the multimedia session object as being communicated under progressive download protocols. If the average transaction size of the transactions associated with the multimedia session object is less than a threshold size (e.g., 1 MB or 2 MB), multimedia classifier can classify (step 662) the content associated with the corresponding multimedia session object as being communicated under non-multimedia protocols.

After steps 644, 662, 670, or 672 for classifying the content associated with the corresponding multimedia session represented by the multimedia media session object as being communicated under one of: HLS, DASH, progressive download, or non-multimedia protocols, method 600 can proceed to a stop 680. It is appreciated that method 600 can be repeated to classify more content.

FIG. 7 is a flowchart representing an exemplary method 700 for classifying content in a plurality of transactions associated with two or more of servers, consistent with embodiments of the present disclosure. Referring to FIG. 7, it will be readily appreciated that the illustrated procedure can be altered to delete steps or further include additional steps. Method 700 can be performed by adaptive traffic manager 130, and more particularly by multimedia detector 224, transaction boundaries detector 226, transaction identifier 228, multimedia session generator 230, multimedia classifier 232, and transaction aligner 234 of the adaptive traffic manager 130. While method 700 is described as being performed by these components of adaptive traffic manager 130, it is appreciated that other components of adaptive traffic manager 130 or other devices can be involved. Further, it is appreciated that any other adaptive traffic manager can also perform method 700.

As discussed above using FIGS. 2-6, adaptive traffic manager 130 can classify content associated with a first multimedia session as being communicated under HLS or DASH protocols. In some embodiments, based on such classification, adaptive traffic manager 130 can further classify content associated with a second multimedia session as being communicated under HLS or DASH protocols, where the second multimedia session is communicated between the same client (e.g., client 210) as the first multimedia session, and the same or different server (e.g., server 262). For example, referring to FIG. 2, a first multimedia session can be communicated between client 210 and server 260; and a second multimedia session can be communicated between client 210 and server 262. Adaptive traffic manager 130 can classify content associated with the second multimedia session using the classification of content associated with the first multimedia session.

Referring to FIG. 7, after an initial step 710, transaction boundaries detector 226 can detect (step 720) boundaries of one or more transactions associated with a second server (e.g., server 262). The one or more transactions associated with the second server can include one or more client requests from client 210 and one or more corresponding server responses from server 262. Multimedia session generator 230 can generate (step 730) a second multimedia session object based on the detected boundaries of the one or more transactions between client 210 and server 262. The multimedia session object can provide an indication of a number of transactions for communicating content associated with the second multimedia session between client 210 and the server 262. The details for detecting transaction boundaries and for generating the second multimedia session object can be substantially similar to those described above, and thus are not repeatedly described.

Referring to FIG. 7, after generating the second multimedia session object representing the second multimedia session, transaction aligner 234 can identify (step 740) a mapping between the one or more transactions associated with the first server (e.g., server 260) and the one or more transactions associated with the second server (e.g., server 262). For example, transaction aligner 234 can identify the mapping using a dynamic time warping (DTW) algorithm based on timestamps of the one or more transactions associated with server 260 and the one or more transactions associated with server 262. Using the DTW algorithm, transaction aligner 234 can determine a score matrix. One or more scores in the score matrix can represent the optimal or least score for matching a transaction associated with server 260 and a transaction associated with server 262.

In some embodiments, transaction aligner 234 can determine (step 750) one or more alignment scores based on the mapping. The one or more alignment scores can form an optimal matching path between all transactions associated with server 260 and all transactions associated with server 262. The alignment scores can be time alignment scores between the first multimedia session represented by the first multimedia session object and the second multimedia session represented by the second multimedia session object. The time alignment scores can be optimal scores or least scores (e.g., smallest scores) for matching each transaction associated with server 260 and each transactions associated with server 262. For example, if a score is the smallest in its row and/or column of the score matrix, it can be the optimal score or the least score. If mapping of a transaction associated with server 260 and a transaction associated with server 262 results in an optimal or smallest score, it can indicate that the two transactions are close in time. The identification of a mapping and the determination of alignment scores are similar to those described in more detail in related U.S. patent application Ser. No. 14/622,139, filed with the current application.

Referring to FIG. 7, multimedia classifier 232 can classify (step 760), based on the alignment score, the content associated with the second multimedia session as being communicated under HLS protocols or DASH protocols corresponding to the classification of content associated with the first multimedia session. For example, if the multimedia classifier 232 classifies the first multimedia session (e.g., the session between client 210 and server 260) as being communicated under the HLS protocols or DASH protocols, and if the alignment score is less than or equal to an alignment score threshold, multimedia classifier 232 can classify the second multimedia session (e.g., the session between client 210 and server 262) as also being communicated under the HLS protocols or DASH protocols, respectively.

After classifying the multimedia content associated with the second multimedia session, method 700 can proceed to a stop 770. It is appreciated that method 700 can also be repeated to classify more content associated with other multimedia sessions communicated with other servers.

In the foregoing specification, an element (e.g., adaptive traffic manager or multimedia classifier) can have one or more processors and at least one memory for storing program instructions corresponding to methods 300, 400, 500, 600, and 700, consistent with embodiments of the present disclosure. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, flash memory, registers, caches, and/or any other storage medium. Alternatively, the methods can be implemented in hardware components or combinations of hardware and software such as, for example, ASICs and/or special purpose computers.

Embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for classifying content in one or more transactions, comprising:
    a transaction boundary detector configured to detect boundaries of the one or more transactions associated with a first server or a first destination, wherein the one or more transactions include one or more requests from a client or a source and one or more corresponding responses from the first server or the first destination;
    a multimedia session generator configured to generate a multimedia session object based on the detected boundaries of the one or more transactions, the multimedia session object providing an indication of a number of transactions for communicating the content associated with a first multimedia session between the client or the source and the first server or the first destination; and
    a multimedia classifier configured to classify, based on the number of transactions indicated by the multimedia session object, the content associated with a first multimedia session as being communicated under at least one of: HTTP live streaming (HLS) protocols, dynamic adaptive streaming over HTTP (DASH) protocols, adaptive bit rate protocols, progressive download protocols, or non-multimedia protocols.

2. The apparatus of claim 1, further comprising a multimedia detector configured to detect the presence of multimedia content in the one or more transactions, prior to the detection of the boundaries by the transaction boundary detector.

3. The apparatus of claim 2, wherein the multimedia detector is configured to detect the presence of the multimedia content in the one or more transactions based on at least one of: one or more handshake messages associated with the one or more transactions, meta-data associated with a connection enabling the first multimedia session, or one or more IP addresses associated with one or more multimedia providing websites.

4. The apparatus of claim 1, wherein the transaction boundary detector is configured to detect boundaries based on at least one of: a closed TCP connection or an idle time between consecutive transactions.

5. The apparatus of claim 1, wherein the transaction boundary detector is configured to detect boundaries comprises the transaction boundary detector being configured to:
   acquire data that is request data or response data, the request data being included in the one or more requests from the client or the source and the response data being included in the one or more corresponding responses from the first server or the first destination;
   determine whether the acquired data is request data or response data;
   if the acquired data is request data, determine whether an active request object is open; and
   if the acquired data is response data, determine whether an active response object is open.

6. The apparatus of claim 5, wherein the transaction boundary detector is configured to determine whether an active request object is open comprises the transaction boundary detector being further configured to:
   if an active request object is open, associate the acquired request data with the active request object; and
   if no active request object is open, generate an active request object and determine whether an active response object is open,
   if no active response object is open, associate the acquired request data with the active request object, and
   if an active response object is open, close the active response object and associate the acquired request data with the active request object.

7. The apparatus of claim 5, wherein the transaction boundary detector is configured to determine whether an active response object is open comprises the transaction boundary detector being further configured to:
   if an active response object is open, associate the acquired response data with the active response object; and
   if no active response object is open, determine whether an active request object is open,
   if no active request object is open, discard the acquired response data, and
   if an active request object is open, close the active request object, generate an active response object, and associate the acquired response data to the active response object.

8. The apparatus of claim 1, further comprising a transaction identifier configured to, prior to the multimedia session generator generates the multimedia session object:
   identify specific transactions in the one or more transactions based on the sizes of the specific transactions.

9. The apparatus of claim 1, wherein the multimedia session generator is configured to generate the multimedia session object comprises the multimedia session generator being configured to:
   identify, based on the detected boundaries of the one or more transactions, transactions that are associated with the same client IP addresses and the same server IP address, or the same source IP addresses and the same destination IP addresses; and
   generate the multimedia session object based on the identification.

10. The apparatus of claim 9, wherein the multimedia session generator is further configured to:
    associate the generated multimedia session object with a look-up table, wherein the lookup table is searchable based on at least one of client IP addresses, source IP addresses, server IP addresses, or destination IP addresses; and
    retrieve the generated multimedia session object from the look-up table before classifying the content associated with the first multimedia session.

11. The apparatus of claim 1, wherein the multimedia classifier is configured to classify the content comprises the multimedia classifier being configured to:
    determine the relation of the number of transactions associated with the multimedia session object with respect to a first threshold number of transactions; and
    if the number of transactions associated with the multimedia session object satisfies the first threshold number of transactions, determine the relation of the number of a first type transactions with respect to a second threshold number of transactions, the first type of transactions having transaction sizes corresponding to an audio transaction size range of the HLS protocols.

12. The apparatus of claim 11, wherein the multimedia classifier is configured to determine the relation of the number of the first type transactions with respect to the second threshold number of transactions comprises the multimedia classifier being configured to:
    if the number of the first type transactions satisfies the second threshold number of transactions, classify the content associated with the first multimedia session as being communicated under the HLS protocols or the DASH protocols based on an identity of the client or the source.

13. The apparatus of claim 11, the multimedia classifier is configured to determine the relation of the number of the first type transactions with respect to the second threshold number of transactions comprises the multimedia classifier being configured to:
    if the number of the first type transactions does not satisfy the second threshold number of transactions, determine the relation of the number of a second type transactions with respect to a third threshold number of transactions, the second type of transactions having transaction sizes corresponding to an audio transaction size range of the DASH protocols; and
    if the number of the second type transactions satisfies the third threshold number of transactions, classify the content associated with the first multimedia session as being communicated under the DASH protocols or the HLS protocols based on an identity of the client or the source.

14. The apparatus of claim 13, wherein the multimedia classifier is configured to determine the relation of the number of the second type transactions with respect to the third threshold number of transactions comprises the multimedia classifier being configured to:
    if the number of the second type transactions does not satisfy the third threshold number of transactions, classify the content associated with the first multimedia session as being communicated under the progressive download protocols or the non-multimedia protocols based on a host name or domain name associated with the first server or the first destination.

15. The apparatus of claim 14, wherein the multimedia classifier is configured to classify the content associated with the first multimedia session as being communicated under the progressive download protocols or the non-multimedia protocols based on the host name or domain name associated with the first server or the first destination comprises the multimedia classifier being further configured to:
- determine the relation of an average transaction size of the transactions associated with the multimedia session object with respect to a threshold size; and
- classify the content associated with the first multimedia session as being communicated under progressive download protocols or non-multimedia protocols based on the determined relation of the average transaction size of the transactions associated with the multimedia session object with respect to the threshold size.

16. The apparatus of claim 1,
wherein a transaction boundary detector is further configured to detect boundaries of one or more transactions associated with a second server or a second destination, wherein the one or more transactions associated with the second server or the second destination include one or more requests from the client or the source and one or more corresponding responses from the second server or the second destination; and
wherein the multimedia session generator is configured to generate a second multimedia session object based on the detected boundaries of the one or more transactions associated with the second sever, the multimedia session object providing an indication of a number of transactions for communicating content associated with a second multimedia session between the client or the source and the second server or the second destination.

17. The apparatus of claim 16, further comprising a transaction aligner configured to:
- identify a mapping between the one or more transactions associated with the first server or the first destination and the one or more transactions associated with the second server or the second destination; and
- determine an alignment score based on the mapping.

18. The apparatus of claim 17, wherein the multimedia classifier is further configured to classify, based on the alignment score, the content associated with the second multimedia session as being communicated under the HLS protocols or the DASH protocols corresponding to the classification of content associated with the first multimedia session.

19. The apparatus of claim 1, wherein at least one of the transactions is a secured transaction.

20. A method for classifying content in one or more transactions, the method being performed by one or more processors, comprising:
- detecting boundaries of the one or more transactions associated with a first server or a destination, wherein the one or more transactions include one or more requests from a client or a source and one or more corresponding responses from the first server or the first destination;
- generating a multimedia session object based on the detected boundaries of the one or more transactions, the multimedia session object providing an indication of a number of transactions for communicating the content associated with a first multimedia session between the client or the source and the first server or the first destination; and
- classifying, based on the number of transactions indicated by the multimedia session object, the content associated with a first multimedia session as being communicated under at least one of: HTTP live streaming (HLS) protocols, dynamic adaptive streaming over HTTP (DASH) protocols, adaptive bit rate protocols, progressive download protocols, or nonmultimedia protocols.

21. The method of claim 20, further comprising:
detecting the presence of multimedia content in the one or more transactions, prior to detecting the boundaries.

22. The method of claim 20, wherein detecting boundaries comprises:
- acquiring data that is request data or response data, the request data being included in the one or more requests from the client or the source and the response data being included in the one or more corresponding responses from the first server or the first destination;
- determining whether the acquired data is request data or response data;
- in response to the determination that the acquired data is request data, determining whether an active request object is open; and
- in response to the determination that the acquired data is response data, determining whether an active response object is open.

23. The method of claim 22, wherein determining whether an active request object is open comprises:
- in response to the determination that an active request object is open, associating the acquired request data with the active request object; and
- in response to the determination that no active request object is open, generating an active request object and determining whether an active response object is open,
- in response to the determination that no active response object is open, associating the acquired request data with the active request object, and
- in response to the determination that an active response object is open, closing the active response object and associating the acquired request data with the active request object.

24. The method of claim 22, wherein determining whether an active response object is open comprises:
- in response to the determination that an active response object is open, associating the acquired response data with the active response object; and
- in response to the determination that no active response object is open, determining whether an active request object is open,
- in response to the determination that no active request object is open, discarding the acquired response data;
- in response to the determination that an active request object is open, closing the active request object, generating an active response object, and associating the acquired response data to the active response object.

25. The method of claim 20, further comprising, prior to generating the multimedia session object:
identifying specific transactions in the one or more transactions based on the sizes of the specific transactions.

26. The method of claim 20, wherein generating the multimedia session object comprises:
- identifying, based on the detected boundaries of the one or more transactions, transactions that are associated with the same client IP addresses and the same server IP address, or the same source IP addresses and the same destination IP addresses; and
- generating the multimedia session object based on the identification.

27. The method of claim 26, further comprising:
associating the generated multimedia session object with a look-up table, wherein the look-up table is searchable based on at least one of client IP addresses, source IP addresses, server IP addresses, or destination IP addresses; and retrieving the generated multimedia session object from the look-up table before classifying the content associated with the first multimedia session.

28. The method of claim 20, wherein classifying the content comprises:

determining the relation of the number of transactions associated with the multimedia session object with respect to a first threshold number of transactions; and in response to the determination that the number of transactions associated with the multimedia session object satisfies the first threshold number of transactions, determining the relation of the number of a first type transactions with respect to a second threshold number of transactions, the first type of transactions having transaction sizes corresponding to an audio transaction size range of the HLS protocols.

29. The method of claim 28, wherein determining the relation of the number of the first type transactions with respect to the second threshold number of transactions comprises:

in response to the determination that the number of the first type transactions satisfies the second threshold number of transactions, classifying the content associated with the first multimedia session as being communicated under the HLS protocols or the DASH protocols based on an identity of the client or the source.

30. The method of claim 28, wherein determining the relation of the number of the first type transactions with respect to the second threshold number of transactions comprises:

in response to the determination that the number of the first type transactions does not satisfy the second threshold number of transactions, determining the relation of the number of a second type transactions with respect to a third threshold number of transactions, the second type of transactions having transaction sizes corresponding to an audio transaction size range of the DASH protocols; and in response to the determination that the number of the second type transactions satisfies the third threshold number of transactions, classifying the content associated with the first multimedia session as being communicated under the DASH protocols or the HLS protocols based on an identity of the client or the source.

31. The method of claim 30, wherein determining the relation of the number of the second type transactions with respect to the third threshold number of transactions comprises:

in response to the determination that the number of the second type transactions does not satisfy the third threshold number of transactions, classifying the content associated with the first multimedia session as being communicated under the progressive download protocols or the non-multimedia protocols based on a host name or domain name associated with the first server or the first destination.

32. The method of claim 31, wherein classifying the content associated with the first multimedia session as being communicated under the progressive download protocols or the non-multimedia protocols based on the host name or domain name associated with the first server or the first destination comprises:

determining the relation of an average transaction size of the transactions associated with the multimedia session object with respect to a threshold size; and classifying the content associated with the first multimedia session as being communicated under progressive download protocols or non-multimedia protocols based on the determined relation of the average transaction size of the transactions associated with the multimedia session object with respect to the threshold size.

33. A non-transitory computer readable storage medium storing instruction that are executable by one or more processors of a computing device to cause the computing device to perform a method for classifying content in one or more transactions, the method comprising:

detecting boundaries of the one or more transactions associated with a first server or a first destination, wherein the one or more transactions include one or more requests from a client or a source and one or more corresponding responses from the first server or the first destination;

generating a multimedia session object based on the detected boundaries of the one or more transactions, the multimedia session object providing an indication of a number of transactions for communicating the content associated with a first multimedia session between the client or the source and the first server or the first destination; and classifying, based on the number of transactions indicated by the multimedia session object, the content associated with a first multimedia session as being communicated under at least one of: HTTP live streaming (HLS) protocols, dynamic adaptive streaming over HTTP (DASH) protocols, adaptive bit rate protocols, progressive download protocols, or nonmultimedia protocols.

34. The computer readable storage medium of claim 33, wherein the set of instructions that are executable by the one or more processors of the computing device to cause the computing device to further perform:

detecting the presence of multimedia content in the one or more transactions, prior to detecting the boundaries.

35. The computer readable storage medium of claim 33, wherein detecting boundaries comprises:

acquiring data that is request data or response data, the request data being included in the one or more requests from the client or the source and the response data being included in the one or more corresponding responses from the first server or the first destination;

determining whether the acquired data is request data or response data;

if the acquired data is request data, determining whether an active request object is open; and if the acquired data is response data, determining whether an active response object is open.

36. The computer readable storage medium of claim 35, wherein determining whether an active request object is open comprises:

if an active request object is open, associating the acquired request data with the active request object; and if no active request object is open, generating an active request object and determining whether an active response object is open, if no active response object is open, associating the acquired request data with the active request object, and if an active response object is open, closing the active response object and associating the acquired request data with the active request object.

37. The computer readable storage medium of claim 35, wherein determining whether an active response object is open comprises:
if an active response object is open, associating the acquired response data with the active response object; and
if no active response object is open, determining whether an active request object is open,
if no active request object is open, discarding the acquired response data;
if an active request object is open, closing the active request object, generating an active response object, and associating the acquired response data to the active response object.

38. The computer readable storage medium of claim 33, wherein the set of instructions that are executable by the one or more processors of the computing device to cause the computing device to further perform:
prior to generating the multimedia session object:
identifying specific transactions in the one or more transactions based on the sizes of the specific transactions.

39. The computer readable storage medium of claim 33, wherein generating the multimedia session object comprises:
identifying, based on the detected boundaries of the one or more transactions, transactions that are associate with the same client IP addresses and the same server IP address, or the same source IP addresses and the same destination IP addresses; and
generating the multimedia session object based on the identification.

40. The computer readable storage medium of claim 39, wherein the set of instructions that are executable by the one or more processors of the computing device to cause the computing device to further perform:
associating the generated multimedia session object with a look-up table, wherein the look-up table is searchable based on at least one of client IP addresses, source IP addresses, server IP addresses, or destination IP addresses; and
retrieving the generated multimedia session object from the look-up table before classifying the content associated with the first multimedia session.

41. The computer readable storage medium of claim 33, wherein classifying the content comprises:
determining the relation of the number of transactions associated with the multimedia session object with respect to a first threshold number of transactions; and
if the number of transactions associated with the multimedia session object satisfies the first threshold number of transactions, determining the relation of the number of a first type transactions with respect to a second threshold number of transactions, the first type of transactions having transaction sizes corresponding to an audio transaction size range of the HLS protocols.

42. The computer readable storage medium of claim 41, wherein determining the relation of the number of the first type transactions with respect to the second threshold number of transactions comprises:
if the number of the first type transactions satisfies the second threshold number of transactions, classifying the content associated with the first multimedia session as being communicated under the HLS protocols or the DASH protocols based on an identity of the client or the source.

43. The computer readable storage medium of claim 41, wherein determining the relation of the number of the first type transactions with respect to the second threshold number of transactions comprises:
if the number of the first type transactions does not satisfy the second threshold number of transactions, determining the relation of the number of a second type transactions with respect to a third threshold number of transactions, the second type of transactions having transaction sizes corresponding to an audio transaction size range of the DASH protocols; and
if the number of the second type transactions satisfies the third threshold number of transactions, classifying the content associated with the first multimedia session as being communicated under the DASH protocols or the HLS protocols based on an identity of the client or the source.

44. The computer readable storage medium of claim 43, wherein determining the relation of the number of the second type transactions with respect to the third threshold number of transactions comprises:
if the number of the second type transactions does not satisfy the third threshold number of transactions, classifying the content associated with the first multimedia session as being communicated under the progressive download protocols or the non-multimedia protocols based on a host name or domain name associated with the first server or the first destination.

45. The computer readable storage medium of claim 44, wherein classifying the content associated with the first multimedia session as being communicated under the progressive download protocols or the non-multimedia protocols based on the host name or domain name associated with the first server or the first destination comprises:
determining the relation of an average transaction size of the transactions associated with the multimedia session object with respect to a threshold size; and
classifying the content associated with the first multimedia session as being communicated under progressive download protocols or non-multimedia protocols based on the
determined relation of the average transaction size of the transactions associated with the multimedia session object with respect to the threshold size.

46. The apparatus of claim 1, wherein the multimedia classifier is configured to classify the content based on a comparison between the number of transactions associated with the multimedia object and multiple threshold numbers of transactions.

* * * * *